United States Patent [19]
Wegrzyn

[11] Patent Number: 5,729,540
[45] Date of Patent: Mar. 17, 1998

[54] SYSTEM AND METHOD FOR SCHEDULING MESSAGES ON A COMMON CHANNEL

[75] Inventor: Jan K. Wegrzyn, San Diego, Calif.

[73] Assignee: Qualcomm Incorporated, San Diego, Calif.

[21] Appl. No.: 780,473

[22] Filed: Jan. 8, 1997

Related U.S. Application Data

[63] Continuation of Ser. No. 545,415, Oct. 19, 1995, abandoned.

[51] Int. Cl.$^6$ ........................................... H04J 3/16
[52] U.S. Cl. .................... 370/336; 370/412; 370/444; 370/458; 370/468
[58] Field of Search ........................ 370/310, 329, 370/336, 337, 341, 345, 346, 347, 348, 349, 431, 442, 443, 444, 458, 459, 461, 462, 463, 465, 468, 472, 473, 498, 537, 538, 539, 540, 541, 464, 412, 413, 414, 415, 416, 417, 418

[56] References Cited

U.S. PATENT DOCUMENTS

| | | | |
|---|---|---|---|
| 4,468,813 | 8/1984 | Burke et al. | 379/88 |
| 4,491,947 | 1/1985 | Frank | 370/94.2 |
| 4,901,307 | 2/1990 | Gilhousen | 370/18 |
| 5,392,287 | 2/1995 | Tiedemann, Jr. et al. | 370/95.1 |
| 5,506,848 | 4/1996 | Drakopoulos et al. | 370/95.1 |
| 5,530,918 | 6/1996 | Jasinki | 455/56.1 |

Primary Examiner—Wellington Chin
Assistant Examiner—Huy D. Vu
Attorney, Agent, or Firm—Russell B. Miller; Brian S. Edmonston

[57] ABSTRACT

A message scheduler in a telecommunications system receives single messages having associated message constraints and stores them on one of a plurality of appropriate queues. The scheduler assembles the messages from the queues in groups by adding received messages to the temporary combined message if the message constraints are satisfied. While prioritizing the messages from the queues, the message scheduler prevents messages from being indefinitely stored on any queue and ensures that operating constraints of the system messages are satisfied. The message scheduler handles message constraints including an earliest starting time and a latest ending time. In addition, some of the messages are slotted messages that must be sent during a predetermined time slot of the telecommunications system. Other messages are unslotted messages and have no such time slot constraint. The grouped messages are passed to a frame formatter which formats the message for transmission. Completed frame are passed from the frame formatter to a modulator driver which stores the messages and provides a steady stream of frames to a modulator for transmission. In this way, the scheduler acts as a buffer between the irregular stream of messages to be sent and the constant stream of frames needed for transmission.

87 Claims, 15 Drawing Sheets

SYSTEM AND METHOD FOR SCHEDULING MESSAGES ON A COMMON CHANNEL

This is a Continuation of application Ser. No. 08/545,415, filed Oct. 19, 1995 now abandoned.

BACKGROUND OF THE INVENTION

I. Field of the Invention

This invention relates generally to spread spectrum telecommunication systems and, more particularly, to cellular telephone system message scheduling.

II. Description of the Related Art

A variety of multiple-access techniques can be used to allow a large number of users to communicate over a telecommunication system within a limited frequency bandwidth. These techniques include, for example, time division multiple access (TDMA), frequency division multiple access (FDMA), and code division multiple access (CDMA). The CDMA technique has many advantages and an exemplary CDMA system is described in U.S. Pat. No. 4,901,307 issued Feb. 13, 1990 to Gilhousen et al., entitled "SPREAD SPECTRUM MULTIPLE ACCESS COMMUNICATION SYSTEM USING SATELLITE OR TERRESTRIAL REPEATERS," assigned to the assignee of the present invention and incorporated herein by this reference.

In a telecommunication system having a large number of mobile users sending and receiving messages from a fixed base station over a common channel, it frequently is necessary for many different types of messages to be transmitted. The messages can comprise recurring system or administrative overhead messages that are regularly generated and must be transmitted to one or more users, or the messages can comprise user-specific messages that are generated in response to system operations. The different message types typically have different message constraints. For example, some types of messages might be priority messages that must be sent immediately upon generation. Other messages might be associated with a specific time before or after which they cannot be sent. Other messages may require a fixed number of repeat transmissions within a time window. Other messages may be associated with a series of time windows or slots during which they must be sent.

Typically, the system which generates the messages and the system which transmits the messages over the air are not synchronized in that messages cannot be transmitted immediately as they are generated. For some periods, more messages may be generated than can be transmitted during the same period. Therefore, the messages must be temporarily stored and scheduled for transmission. The base station attempts to schedule the messages in accordance with the constraints associated with each message. One method of scheduling the messages is to assign them to message types, or categories, in order of priority (or sending time) and to schedule the messages for transmission such that all messages of a particular priority level are sent before messages of the next lower priority level. Unfortunately, during periods of peak message traffic, this scheme could result in some low priority messages never being sent. This scheme can create errors in system operation. An optimal message scheduling method is difficult to implement because as the number of messages increases, the complexity of the system may increase in a nonpolynomial manner requiring overly large amounts of memory and processor time to implement.

In the CDMA cellular telephone system described in the above-referenced '307 patent, a large number of mobile users, each having a transceiver, communicate through satellite repeaters or terrestrial-based stations, which are also referred to as base stations or cell sites. Each base station provides coverage for a limited geographical area, or cell, and links the mobile users in its coverage area to the public-switched telephone network (PSTN). When a mobile user moves to a coverage area of a new base station, the routing of that user's call is transferred to the new base station. The base station-to-mobile unit signal connection is generally referred to as the forward link and the mobile unit-to-base station signal connection is generally referred to as the reverse link.

The CDMA technique described in the '307 patent splits the available system frequency spectrum into multiple sub-bands and transmits multiple messages simultaneously within one of the frequency sub-bands, thus permitting an increase in the number of calls that can be in progress at any one time. The CDMA technique also permits system messages to be transmitted simultaneously over the channels for system administrative purposes to multiple mobile units. In the CDMA technique of the '307 patent, the base station and mobile units communicate over a plurality of channels within one frequency sub-band. The channels are used for different purposes. For example one sub-band may contain a pilot channel, a synchronization channel, a paging channel, a plurality of traffic channels and an access channel. Each base station includes a channel element modem which provides an interface between the land-based telephone lines and the transceiver of the base station. The channel element modem may include a single or multiple application-specific integrated circuits (ASICs) that support modules for each of the five channels listed above.

The paging channel is the channel through which the base station controller of a CDMA base station sends messages to mobile units that are not currently engaged in ongoing communication. The paging channel carries an unusually large volume of message traffic because it continuously broadcasts information such as system parameters to the mobile units within a coverage area of the base station. Such system parameters include the base station identification code, the site location information, and the like. Messages on the paging channel include data fields comprising a header, message data, and a trailer. The messages are accumulated, or placed in a queue, as they are received from the base station controller. In the CDMA system such as described in the '307 patent, message types are processed according to a priority ranking and are placed in a queue matching their priority. The messages are then transmitted by priority queue, messages from the highest priority queue being sent before messages from lower priority queues.

More particularly, the channel element modem conventionally maintains a separate message queue for each message priority class. When the channel element modem begins scheduling messages, it simply takes all messages of a particular priority class and schedules them. The first-priority queue must be emptied and fully scheduled before the second-priority queue is scheduled, the second queue must be emptied and scheduled before the third queue is scheduled, and so forth so that a message in a lower priority queue is not scheduled until the preceding queues are empty. If messages from a queue are being scheduled and new messages arrive for a higher priority queue, the new messages are scheduled first. As a result, it is possible for messages to remain in the lower priority queues indefinitely under situations of high message traffic. Proper system operation, however, requires that all messages eventually are sent.

From the discussion above, it should be apparent that there is a need for message scheduling in a telecommunication system that ensures all message constraints are met and that all messages are sent in timely manner. However the message scheduling must be performed using an efficient amount of memory and processing resources. The present invention satisfies this need.

SUMMARY OF THE INVENTION

In accordance with the present invention, a message scheduler uses a efficiently limited amount of storage and processing power while providing proper system-wide scheduling results. The present invention is an efficient and effective method and apparatus for scheduling messages. The messages can be one of three types: overhead messages which have a top priority, slotted messages which have a second but qualified priority, and unslotted messages which have the lowest priority. Within each of the slotted and unslotted messages are primary and repeat messages. The repeat messages take priority over the primary messages within slotted and unslotted message groups. The priority of the slotted queue is qualified such that no message, even one of the lowest priority, is left on any queue indefinitely even at the highest traffic level.

In the present system, mobile user directed single messages intended for transmission over a channel are received from a system controller by the scheduler sporadically as they are created. Each single message may be classified as a slotted or unslotted message. Some of the slotted and unslotted messages are repeated and therefore become repeat slotted and unslotted messages respectively after the first transmission. Overhead messages must be scheduled periodically by the scheduler. Frames of data must be uniformly transferred from the scheduler and a modulator driver to a modulator for transmission. Thus, the scheduler is charged with arranging and formatting the sporadic and periodic messages into a uniform stream of data frames. To do so, the present invention uses a method in which the amount of time that the scheduler accumulates messages before beginning to schedule the messages is dependent on the amount of message traffic. When message traffic is low, the scheduler automatically reduces the allotted time for scheduling messages to minimize the scheduling delay. When message traffic is high, the scheduler automatically increases the allotted time for scheduling the messages so that the corresponding increase in time required to schedule the messages is accommodated.

The single messages in both the slotted and unslotted queues are one of several types of messages. Within the several message types, some are simple and some are combined messages. The combined messages are capable of supplying records corresponding to a plurality of the single messages while the simple messages are limited to one record corresponding to one single message.

In the present invention, three queues are used which store the slotted, unslotted and overhead messages. The message scheduler uses a temporary data structure, referred to as a combined messages and scheduling data block, to build a set of messages. During each scheduler processing cycle, the scheduler schedules the messages in a fixed order. Each of the seven message types is designated a set of parameters in memory. The scheduler provisionally adds the single messages one at a time from a first one of the queues. After provisionally adding the next message, the scheduler checks the parameters corresponding to the present message type and corresponding to each message type which is scheduled after the type of the next message. If any parameter is violated, the scheduler does not schedule the message during the current processing cycle.

The processing cycles are of variable duration, produce varying amounts of data and can be easily interrupted in response to time out conditions or due to the need to schedule one or more of the overhead messages. The scheduler processing cycles are repeated one after the other during each scheduling invocation acting as an arbiter between the sporadic reception of messages and the steady output of data frames.

DESCRIPTION OF THE PREFERRED EMBODIMENT

Figure 1:
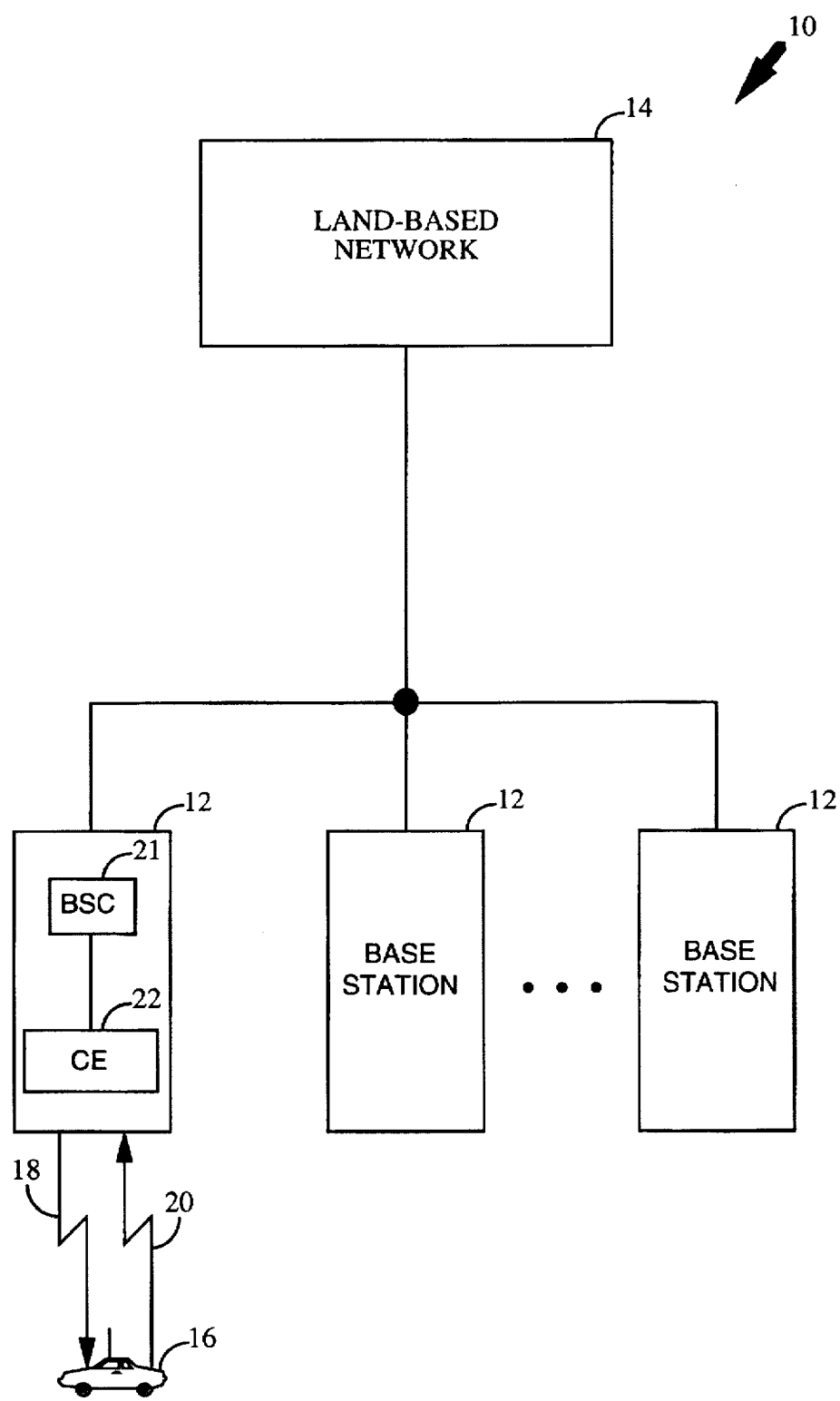
FIG. 1 is a block diagram of a CDMA communication system constructed in accordance with the present invention.

FIG. 1 is a representation of a telecommunication system 10 in which a plurality of base stations 12 constructed in accordance with the present invention communicate with landline telephone users (not shown) connected over a land-based network 14 and also with one or more mobile units 16 over a forward transmission link 18 when transmitting to a mobile unit and over a reverse transmission link 20 when receiving from a mobile unit in accordance with a code division multiple access (CDMA) or other multiple access standard. For example, the preferred embodiment of the present invention is based on the Telecommunication Industry Association document "Mobile Station-Base Station Compatibility Standard for Dual-Mode Wideband Spread Spectrum Cellular System," TIA/EIA/IS-95 commonly referred to as simply IS-95. Each base station 12 handles communication with mobile units located within its assigned geographic coverage area. Each base station 12 includes a base station controller (BSC) 21 and a channel element (CE) 22 that control the transmission and a reception of the forward and reverse links.

In this discussion, the term "mobile unit" is used to refer generally to the remote subscriber station for the purposes of this description. Note, however, that the mobile unit may be fixed in location. The mobile unit may be part of a multiple user concentrated subscriber system. The mobile unit may be used to carry voice, data, or a combination of signal types. The term "mobile unit" is a term of art and is not meant to limit the scope or function of the unit.

Figure 2:
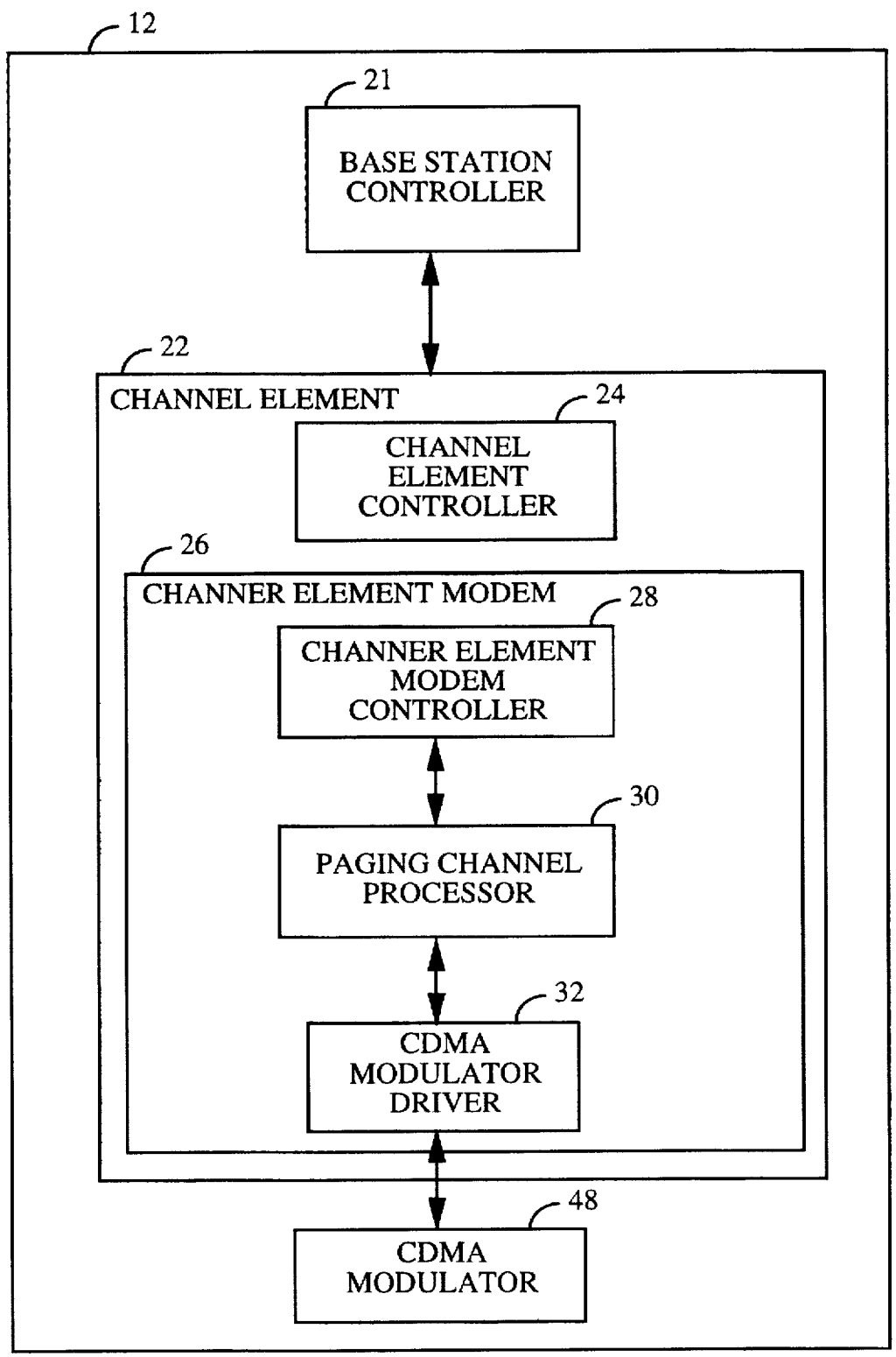
FIG. 2 is a block diagram of one of the base stations illustrated in FIG. 1.

FIG. 2 is a block diagram of one of the base stations 12 and illustrates that each channel element 22 receives input messages to be scheduled for transmission from the base station controller 21. FIG. 2 shows that each channel element 22 includes a channel element controller 24 and a channel element modem (CEM) 26. The channel element modem 26 operates under control of a CEM controller 28 and includes a paging channel processor 30 that performs most of the input message processing, such as scheduling, and also includes a CDMA modulator driver 32 that prepares messages for transmission in accordance with the CDMA standard. The CEM controller 28 receives control information about the paging channel from the base station controller 21 and also receives mobile units directed messages for the paging channel and passes this information on to the paging channel processor 30. As described in greater detail below, paging channel processor 30 provides the data frames to the CDMA modulator driver 32 which passes each frame to a CDMA modulator 48 which causes transmission of the data frame.

In the preferred embodiment the channel element 22 may comprise a plurality of channel element modems each of which provides communication for one channel. For example, a traffic channel is used to sustain ongoing communication with one of the mobile units. Another channel element modem may be assigned to monitor a common access channel used by a plurality of the mobile units to communicate with the base station when ongoing communication is not established. Still another may be used to generate an identifying pilot signal for the base station. Details about each of these channels is disclosed in IS-95 as referenced above.

Figure 3A:
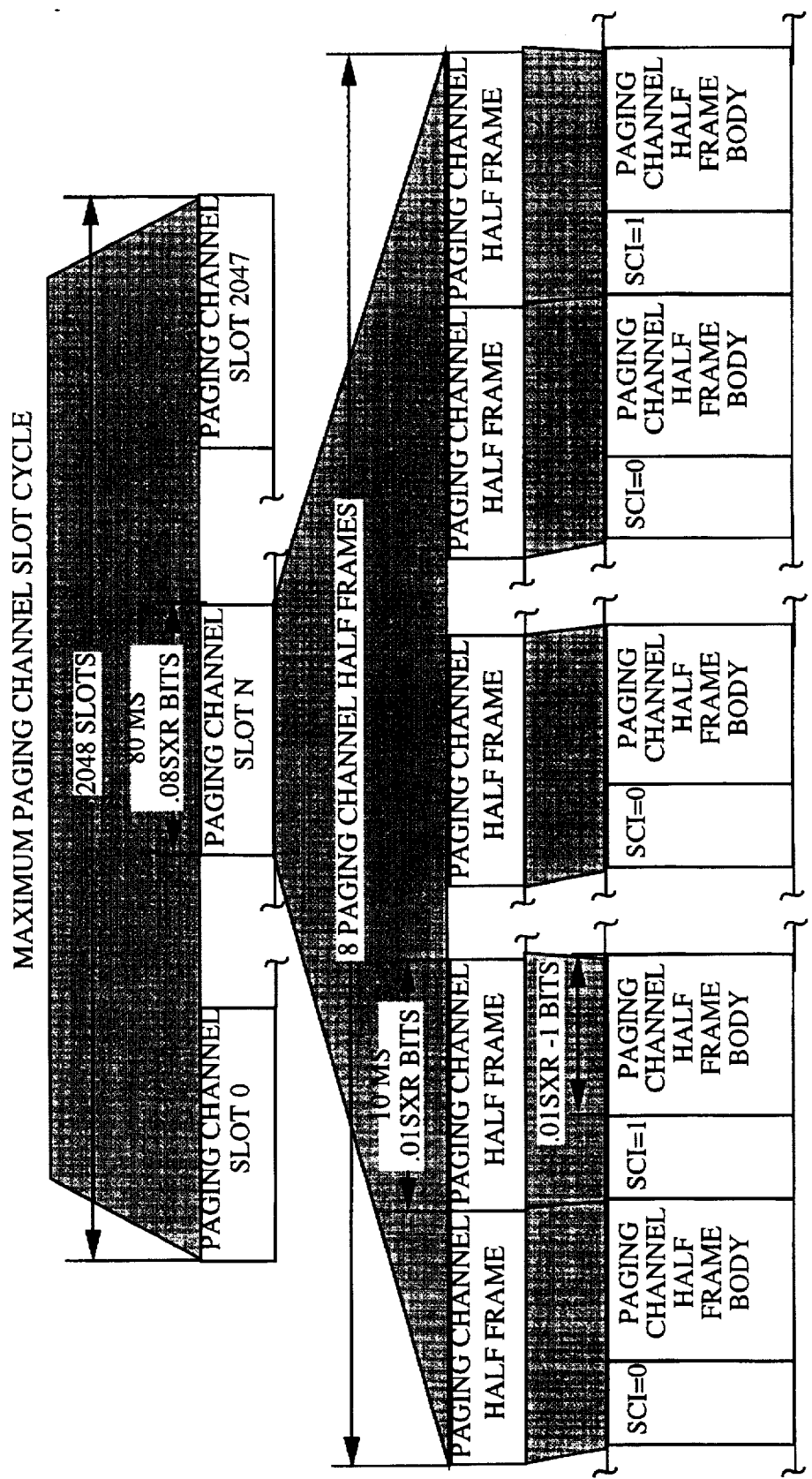
FIGS. 3A and 3B are a representation of the paging channel configuration for the CDMA system illustrated in FIG. 1.
Figure 3B:
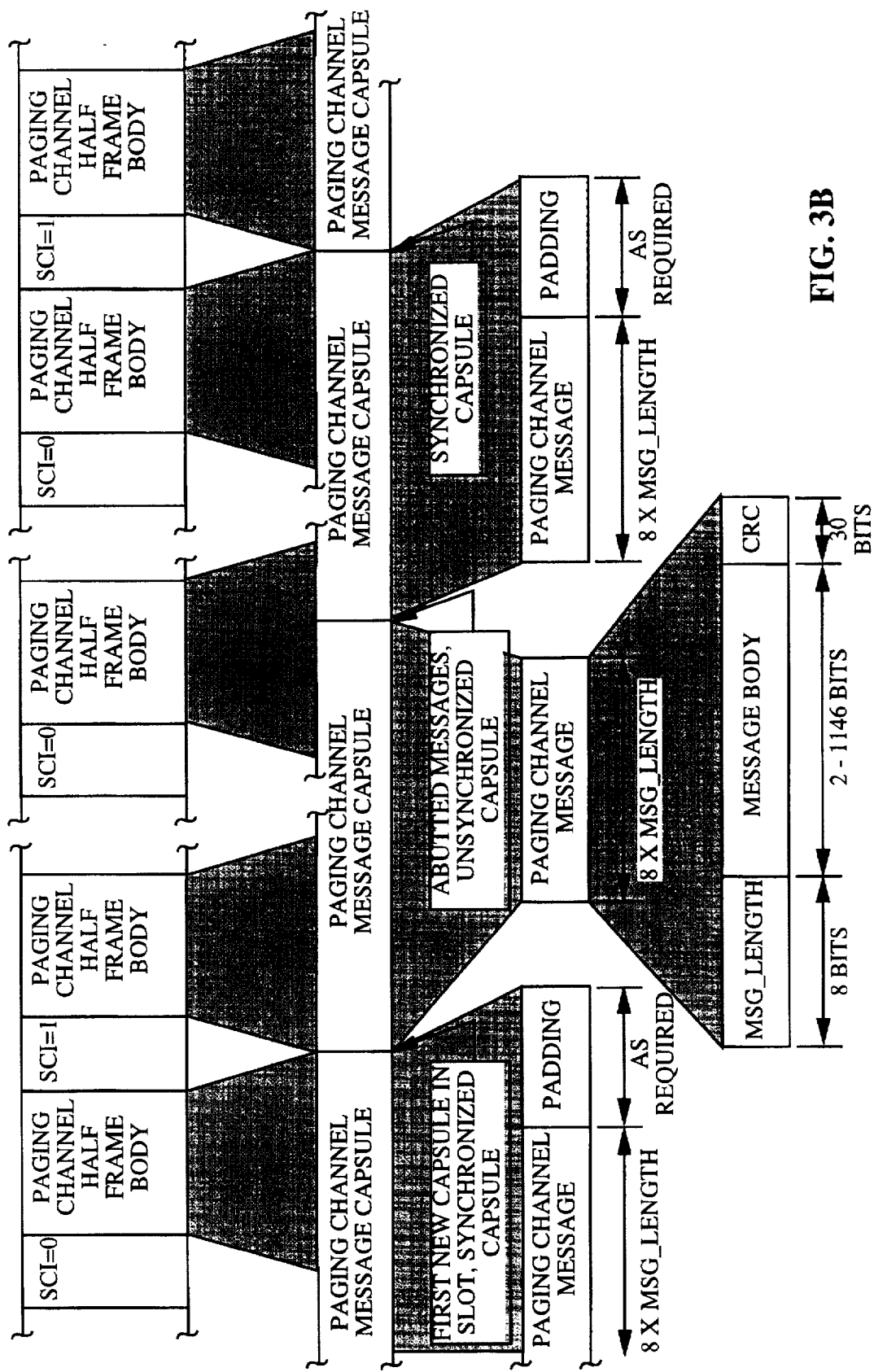

Before explaining the operation of the paging channel processor in greater detail, it is necessary to explain the data flow over the paging channel of the CDMA standard on which the system 10 is based. FIGS. 3A–B illustrate the paging channel data structure. The paging channel is a stream of bits transmitted over the system 10. The stream of bits is divided into fixed length blocks of bits called frames. Frames are transmitted at the rate of fifty per second, so that one paging channel frame spans twenty milliseconds (20 msec.) The number of bits actually present in a frame depends on the data rate of the channel. The CDMA standard permits two paging channel data rates: either 9600 bits per second or 4800 bits per second. Typically, the data rate is chosen at the time the system is deployed and remains fixed over time. Thus, a frame can consist of either 192 bits or 96 bits, respectively. FIGS. 3A–B show that each frame is divided into two half-frames. The first bit in each half-frame is reserved as a synchronized capsule indicator (SCI) bit, described more fully below. In the paging channel, four complete frames (corresponding to eight half frames) constitute a slot. Paging channel slots are numbered consecutively from zero to 2047 before repeating. That is, the slot numbering convention is 0, 1, 2, . . . , 2046, 2047, 0, 1, 2, . . . , etc. Numbering the slots in this way provides a way of tracking system time.

In addition to being organized according to frames, the bits transmitted over the paging channel are also organized into message capsules. Each message capsule consists of the paging channel information and padding bits if needed. A paging channel message includes a length field of eight bits, a message body having between 2 and 1146 bits, and a code reducing check (CRC) error field of thirty bits. Any padding bits following the paging channel message to complete the message capsule are set to zero. Message capsules can be synchronized or unsynchronized. A message capsule is called synchronized, when it starts at the second bit of a half frame. Because the first bit of the half frame is always SCI, the synchronized message capsule starts just after the SCI bit. Otherwise the message capsule is called unsynchronized. If a current message does not end exactly at the last bit of a half-frame, the base station can send the next message in an unsynchronized message capsule. Alternatively, the base station can add a sufficient number of padding bits in the message capsule to extend the message capsule beyond the length of the paging channel message to the bit preceding the next SCI bit. Thus, the next message capsule sent is a synchronized message capsule.

The first message capsule corresponding to the current paging channel slot is always sent as a synchronized message capsule, although it need not be the first half frame of the slot. For example, the first message capsule corresponding to the present slot may not start on first half frame of the current slot when the last message capsule corresponding to the previous slot extends into the current slot. The concept of synchronized capsules and SCI bits helps the mobile units to synchronize with the bit stream on the paging channel. When the mobile unit begins to monitor the paging channel, it receives the stream of bits on the paging channel. Without some form of synchronization, it is impossible for the mobile unit to find message organization looking only to the bits. So the mobile unit which is aware of the half frame timing, monitors the SCI bits of each received half frame until it finds a half frame with the SCI bit set to 1. Then the mobile unit knows that the next message capsule starts with the next bit. The first field of the message capsule is 8 bits long and specifies the length of the message in octets in the preferred embodiment. In the preferred embodiment, the maximum message length is 148 octets or 1184 bits. As explained below, the maximum message length constrains the scheduling of the paging channel messages. At the end of a message capsule, if the next 8 bits are all zeros, the mobile units know that the bits are padding bits as the message length cannot be zero. The mobile units then know that the next message capsule is synchronized. If they are not zero, this is the message length field of the next message. Such an arrangement helps the mobile units to synchronize with the paging channel bit stream. Once having monitored an SCI bit equal to one, the structure of the remainder of the message is then known by the mobile unit from the CDMA standard. In this way, a mobile unit can search for a "one" SCI bit each time it begins initial operation, wakes up to monitor a slot or for any other reason loses paging channel synchronization.

The CDMA modulator driver 32 (FIG. 2) receives frames of data which it places in its input queue. Each frame includes a time stamp that specifies when it should be transmitted. When the frame is due, the CDMA modulator driver 32 removes the frame from its input queue and causes it to be transmitted over the paging channel. The CDMA modulator driver 32 notifies the paging channel processor 30 when the number of frames on its input queue is below a threshold value. The larger the threshold value, the more time the paging channel processor 30 has to prepare new frames upon notification. The threshold value is set by the paging channel processor 30 as detailed below.

MESSAGE TYPES

The CDMA standard includes several paging channel message types including overhead messages, mobile unit directed messages, and null messages. Overhead messages contain information that enables mobile unit-to-base station communication. Mobile unit directed messages are addressed to specific mobile units. Null messages contain no information.

Overhead messages are not addressed to any specific mobile unit but are intended for distribution to each mobile unit within the corresponding coverage area. In accordance with the CDMA standard, there are, in turn, four types of overhead messages: system parameters, access parameters, channel list, and neighbor list overhead messages. Each type of overhead message must be broadcast at least once per second. For example, the neighbor list overhead message continually broadcasts a list of neighboringbase stations through which communication may be possible. The mobile units use the neighbor list to monitor signals from the neighboring base stations in the event that the mobile unit enters the coverage area of neighboring base stations.

In accordance with the CDMA standard, a mobile unit directed message can be any one of the following types: a page message, a mobile unit order message, a channel assignment message, a data burst message, an authentication challenge message, a shared secret data (SSD) update message, or a feature notification message. (To distinguish the terminology, a page message refers to a type of mobile unit directed message while a paging channel message refers to the message contained within a message capsule such as shown in FIGS. 3A and 3B. The paging channel message may be any type of overhead or mobile unit directed message.) Each mobile unit directed message includes data identifying the mobile unit to which the message is directed. Page messages, mobile order messages, and channel assignment messages may contain multiple single message entries each of which is directed to a different mobile unit. Page messages, mobile order messages, and channel assignment messages, whether or not they actually contain multiple entries, are referred to as combined messages. The remaining mobile unit directed messages which can contain only a single message entry are referred to as simple messages. More information about the format and function of each type of message is disclosed in the above mentioned IS-95 document. Obviously, the scheduling techniques disclosed herein are applicable independent of the form, function and quantity of message types.

Figure 6:
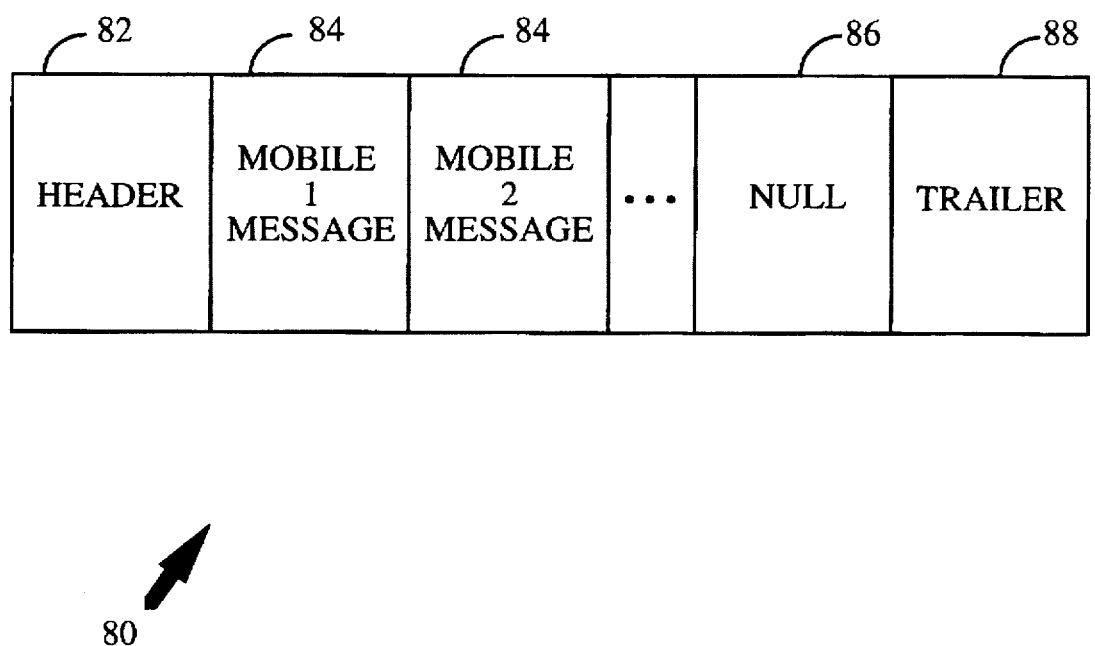
FIG. 6 is a representation of a combined paging channel message structure.

FIG. 6 shows a complete combined message 80 having a header field 82, followed by one or more messages 84 and a null pad 86, followed by a trailer field 88. The null pad 86 is simply a set of bits set to zero. As noted above, the message length indicated in the header is specified in octets. The null pad 86 is used to set the total length of the message in bits to an integer multiple of eight. The simple message has the same format as the complete combined message 80 except that only one message 84 is placed between the header 82 and the trailer 88.

A mobile unit can operate in either a slotted mode or an unslotted mode. When a mobile unit is operating in the slotted mode, it monitors the paging channel only during specific time periods referred to as time slots or just slots. For example, a mobile unit might monitor only every fourth slot, so that it monitors that paging channel only during the slots 0, 3, 7, etc. Slotted mode permits a mobile unit to reduce its power consumption. A mobile unit directed message intended for a mobile unit that is operating in the slotted mode can only be received during those slots when the mobile unit is actively monitoring the paging channel. The base station knows the current operating mode of each mobile unit in its coverage area and can determine the slots during which each mobile unit is monitoring the paging channel. More information on slotted mode operation is disclosed in U.S. Pat. No. 5,392,287 entitled "APPARATUS AND METHOD FOR REDUCING POWER CONSUMPTION IN A MOBILE COMMUNICATIONS RECEIVER" issued Feb. 21, 1995 and assigned to the assignee of the present invention.

The page message is used to facilitate the dissemination of information contained in the overhead messages without having to retransmit the overhead messages in every slot which unnecessarily limits the paging channel's capacity to send other messages. If an updated overhead message is transmitted which reflects a change in the manner in which the base station operates and the updated overhead message is transmitted during a slot when a mobile unit operating in the slotted mode is not monitoring the paging channel, the mobile unit is not notified about the change. To control effect of missed overhead messages, each overhead message is assigned a sequence number. Each time the base station changes the content of an overhead message, it changes the sequence number. The base station includes the current sequence number of the overhead messages in each page message and at least one slotted page message is associated with each slot. The slotted page message with the overhead sequence number is sent even if there are no slotted page messages to be sent to the mobile units.

When a mobile unit operating in the slotted mode receives a page message, it compares the received overhead sequence number with the sequence number from the last overhead message it received even if the page message does not contain a message directed toward this mobile unit. If the sequence numbers do not match, the mobile unit knows it missed a new overhead message and leaves the slotted mode for the unslotted mode. During the unslotted mode, the mobile unit listens to the paging channel during each slot until it receives a new version of the overhead messages corresponding to the latest sequence number. The mobile unit may return to the slotted mode after reception of the overhead messages.

Most mobile unit directed paging channel messages have the same format whether they are sent to a mobile unit operating in the slotted mode or the unslotted mode. However, the page message has two different formats depending on whether the page message is associated with the slotted or unslotted message queue. (The slotted and unslotted message queues are explained in greater detail subsequently herein.) The slotted page message has an additional field which indicates whether or not there is at least one more paging channel message associated with the current slot. Upon receiving a positive indication, each mobile unit operating in slotted mode continues to monitor the paging channel into the next time slot until a slotted page message is received which indicates that no more pages are associated with the current slot. Due to this operating scheme, no message directed to a mobile unit operating in slotted mode should be transmitted after the last slotted page message corresponding to the current slot. The unslotted page message has no such field to indicate more pages corresponding to the current slot. Upon receiving a negative indication, each mobile unit operating in slotted mode may stop monitoring the paging channel even if there is time remaining in the current slot.

At least one slotted page message is sent corresponding to each slot even if no slotted pages are queued corresponding to the current slot. If no input page messages are queued, the slotted page message consists only of the message header such as header 82 of FIG. 6 without any message 84. It is also the header 82 which comprises the overhead sequence number.

In order to increase the probability of message reception by the mobile unit, the base station may send a message several times in quick succession. The above mentioned standard, IS-95, specifies that all retransmissions of the same message must be completed within a specified time called the maximum retransmission time after the first transmission. If for any reason the message cannot be repeated within the maximum retransmission time, the message is discarded and no more attempts are made to repeat the message after the maximum retransmission time has elapsed.

With the above-described understanding of the paging channel message stream and mobile unit operating scheme, the structure of the channel element is explained next in greater detail.

THE PAGING CHANNEL PROCESSOR

The paging channel processor must schedule the incoming stream of messages from the channel element controller as well as the overhead messages. Note that the timing of the messages arriving from the base station processor is unrelated to the frame timing used on the paging channel. The paging channel processor must schedule the messages from the base station controller and the overhead messages in such a way that the limited paging channel message capacity is used efficiently. The paging channel processor must meet the message scheduling criteria such as the number of repeats as discussed above. The paging channel processor must schedule the messages such that no message is stacked indefinitely even during the most heavy loading. The paging channel processor must use a realistic amount of memory and processing power and it must respond to input messages in a timely and organized manner. To facilitate operation, the paging channel processor produces blocks of messages in a series of scheduler processing cycles.

Note that the CDMA modulator driver expects data formatted in frames with the proper over-the-air protocol headers and trailers. The frame boundaries can be unrelated to the paging channel message boundaries as illustrated in FIG. 3.

Figure 4:
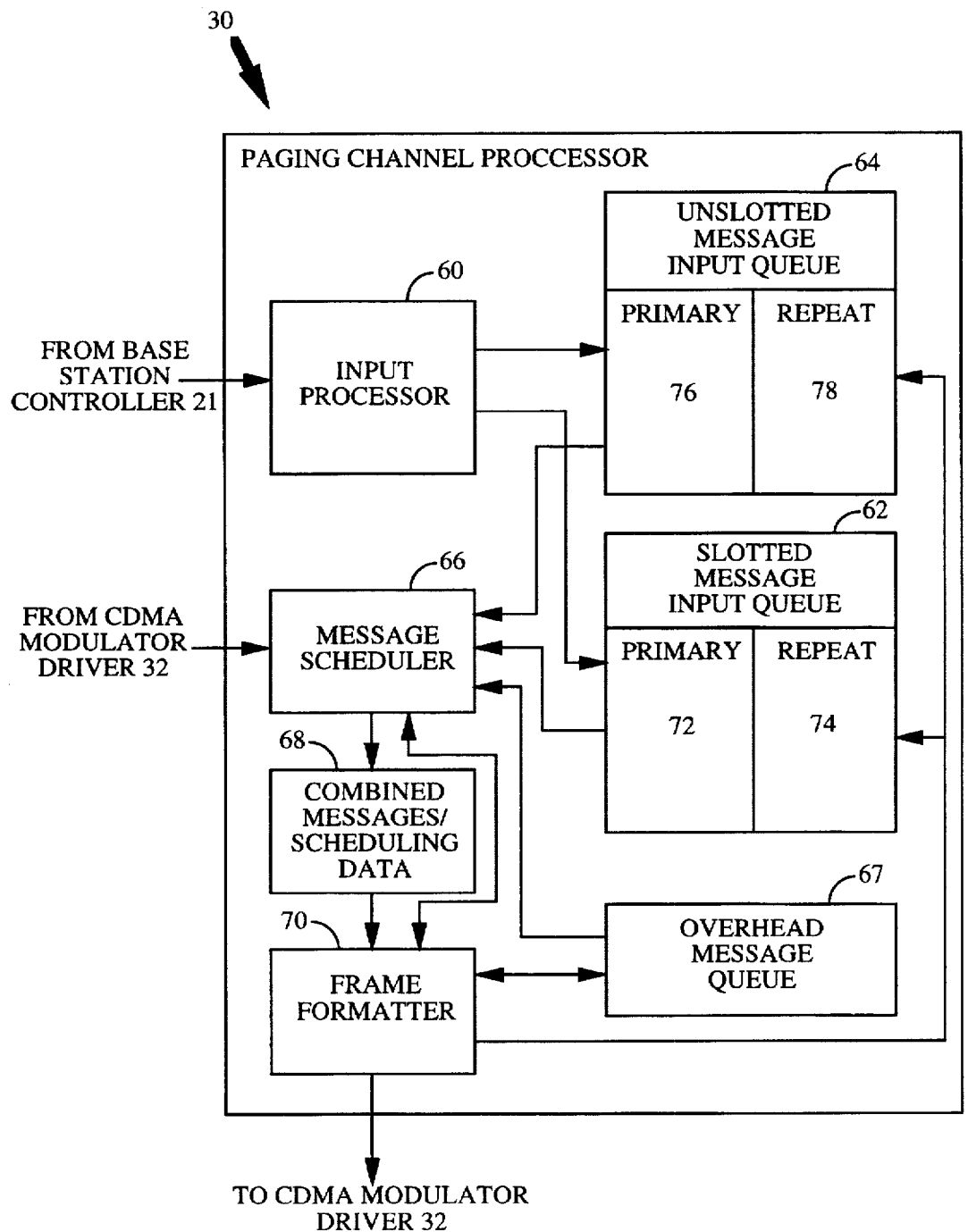
FIG. 4 is a block diagram of the paging channel processor illustrated in FIG. 2.

FIG. 4 is a block diagram of the paging channel processor 30 illustrated in FIG. 2. The base station controller 21 sends information comprising the single input messages to an input processor 60 that places the input messages in either a slotted message input queue 62 or an unslotted message input queue 64. For each input message, the base station controller 21 also specifies whether the mobile unit to which the message is to be sent is operating in the slotted mode or the unslotted mode. For a message intended for a mobile unit in the slotted mode, the base station controller 21 includes information on how to compute the slots during which the mobile unit is listening. The base station controller 21 also may require that an input message is to be repeated (i.e., retransmitted) a specified number of times. The base station controller 21 also may specify an earliest time the message may be sent and a latest time the message may be sent. In addition to sending the single input messages, the base station controller 21 also initially provides overhead information which must be periodically transmitted over the paging channel. Overhead messages are stored in an overhead message queue 67 as they are received from the base station controller 21 and are repeated therefrom until they are updated by new overhead information from the base station controller 21.

The paging channel processor 30 includes a message scheduler 66 that takes messages from the slotted and unslotted message input queues 62 and 64 and places the messages in a temporary data structure in a combined messages/scheduling data block 68 where they are assembled. The assembled messages are called over-the-air (OTA) messages. The format of the OTA messages is implementation specific.

When an input message is added to the temporary data structure of the combined message/scheduling data block 68, the message is removed from its respective input queue 62 or 64. The assembled messages from the combined message/scheduling data block 68 are processed by a frame formatter 70 which adds proper header and trailer blocks to the OTA messages to create the paging channel messages within the message capsules, divides the message capsules into frames and eventually passes the frame data to the CDMA modulator driver 32 (FIG. 2) for transmission.

Input queues 62 and 64 include a primary slotted message input queue 72 and a repeat slotted message input queue 74, and a primary unslotted message input queue 76 and a repeat unslotted message input queue 78 respectively. The slotted message input queue 62 contains the primary slotted message input queue 72 that contains slotted messages, which must be sent during a predetermined system time slot. The repeat slotted message input queue 74 contains single messages that have been transmitted at least once and require repeating during predetermined time slots. A single message is placed on the repeat slotted message input queue 74 by the message scheduler 66 after it is scheduled for the first time only when it requires repeating. It remains on the repeat slotted message input queue 74 until it is repeated the required number of times or until it is discarded when the maximum retransmission time has elapsed.

The unslotted message input queue 64 includes the primary unslotted message input queue 76 that contains single unslotted input messages that have no time slot constraints. Likewise the repeat unslotted message input queue 78 contains unslotted single messages that have been transmitted at least once and require repeating. A single message is placed on the repeat unslotted message input queue 78 after it is scheduled for the first time only when it requires repeating. It remains on the repeat unslotted message input queue 78 until it is repeated the required number of times or until it is discarded when the maximum retransmission time has expired. As seen below, because the messages in the repeat slotted message input queue 74 and repeat unslotted message input queue 78 must be repeated before the maximum retransmission time lapses, the messages from the repeat slotted message input queue 74 and repeat unslotted message input queue 78 are scheduled before messages from the primary slotted message input queue 72 and primary unslotted message input queue 76 respectively.

In the preferred embodiment, the input processor 60 adds a time stamp to single input messages that indicates when the input message was received. The input processor 60 places received unslotted messages in the unslotted message input queue 64 in the order in which they arrive, according to their time stamp value. The input processor 60 places received slotted messages in the slotted message input queue 62 according to two indexes: first, according to the first slot during which the message may be sent, and second, according to the message arrival time (the time stamp value). Thus, the slotted message input queue 62 is indexed by slot number and, within a slot, by message arrival time.

As noted above, the paging channel processor 30 receives a frame request from the CDMA modulator driver 32 when the number of frames on the modulator driver's input queue drops below a threshold value. In response, the paging channel processor 30 selects messages from the slotted message input queue 62, unslotted message input queue 64 and/or overhead message queue 67 and assembles one or more OTA messages, formats them into frames, and provides the frames to the CDMA modulator driver 32. The paging channel processor 30 also maintains a data structure called a next message pointer, described more fully below, that specifies the starting transmission time of the next message to be scheduled.

In the preferred embodiment, the channel element 22 may adjust its operation depending on the volume of message traffic. Accordingly the channel element 22 reduces the number of messages provided to the paging channel processor 30 if the paging channel processor 30 indicates a large number of faults. For example, the message scheduler 66 indicates a "fault" condition when a message from the repeat slotted message input queue 74 is not repeated the required number of times before the maximum transmission delay time out expires.

Figure 5:
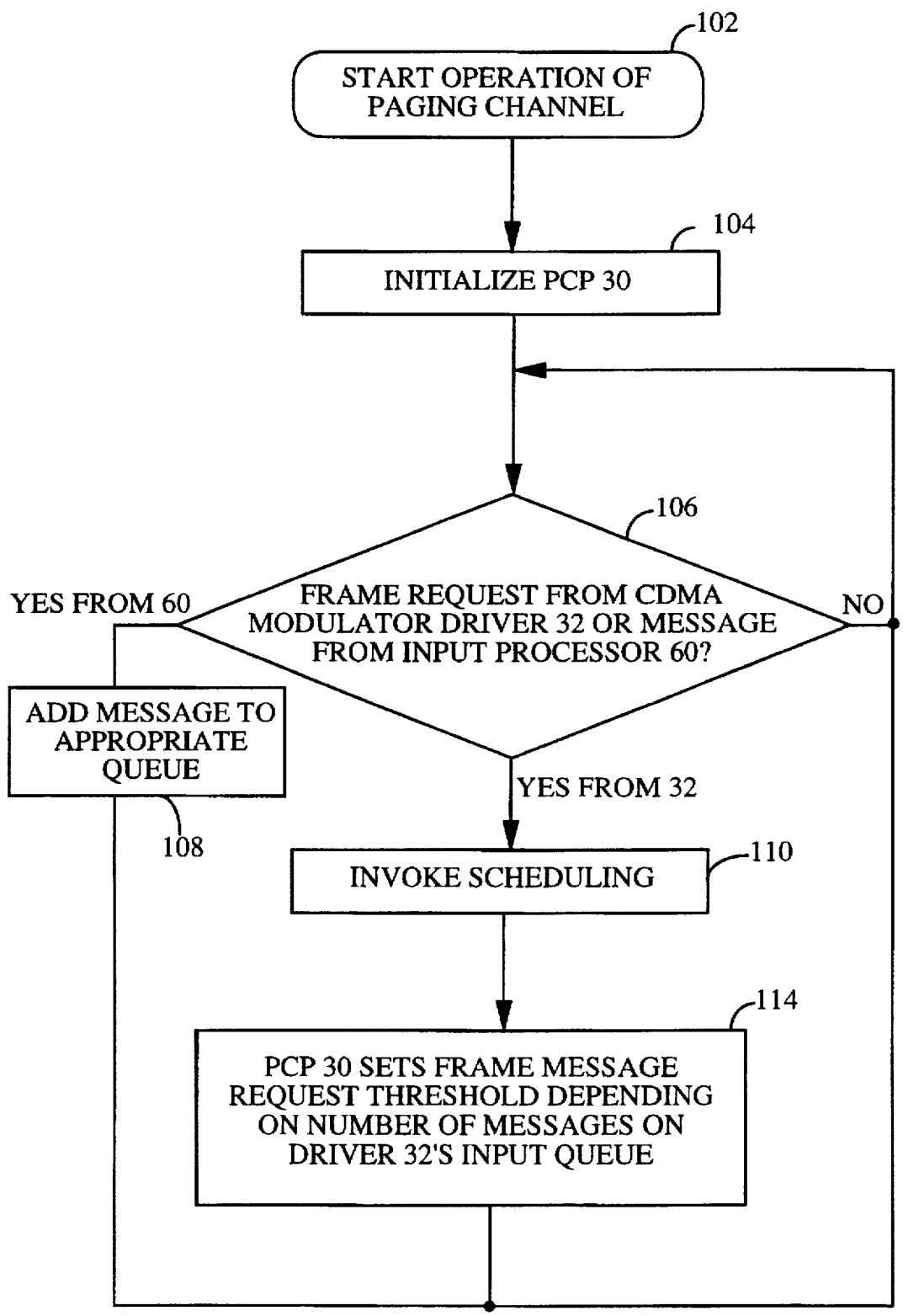
FIG. 5 is a flow diagram that illustrates the processing of the channel element illustrated in FIG. 4.

The sequence of events that occur under the control of the paging channel processor 30 is summarized in the flow diagram of FIG. 5, which illustrates the processing steps carried out. At a starting time represented by the flow diagram box numbered 102, the paging channel processor 30 receives a command to begin operating the paging channel. Next, as represented by the flow diagram box numbered 104, the paging channel processor 30 performs an initialization routine, described in further detail below. During its normal operation, the paging channel processor 30 waits for frame requests from the CDMA modulator driver 32 or an input message from input processor 60, block 106. If the paging channel processor does not receive a frame request or incoming message (a negative outcome), the paging channel processor 30 sits idle.

In the preferred embodiment, the paging channel processor 30 is one of a number of entities which share the processing resources of a multipurpose microprocessor in a multitasking manner. Each of the entities which shares the microprocessor sends a request to the microprocessor when the entity has a process to carry out. In block 106 of FIG. 5, only those functions within paging channel processor 30 which stimulate a request for processing power are shown. In reality, a plurality of other entities, for example circuitry creating the synchronization or pilot channels, may also be waiting for stimulus. One of the important features of the present invention is that it uses only a portion of the available processing resources and leaves as much processing resources as possible for the other multitasking entities with which paging channel processor 30 shares processing resources.

When the paging channel processor 30 receives a new message, the input processor 60 places the message on the proper queue with the proper time constraints as indicated by block 108. Subsequently the process re-enters block 106 to await the next stimulus.

When the paging channel processor 30 receives a frame request, scheduling is invoked and messages are ordered, as represented by the flow diagram box numbered 110 and the frame formatter 70 builds at least one data frame and sends it to the CDMA modulator driver 32 for subsequent transmission. Next, the paging channel processor 30 sets the frame message request threshold in accordance with the number of frames on the CDMA modulator driver input queue, block 114. Finally, the process re-enters block 106 to await the next stimulus.

PAGING CHANNEL PROCESSOR INITIALIZATION ROUTINE

Before the paging channel processor 30 can begin operating the CDMA paging channel, it must receive all configuration parameters. These parameters include the contents of all overhead messages. During a paging channel processor initialization routine (block 104 of FIG. 5), the paging channel processor 30 synchronizes itself with slot boundaries using a system clock and time of day indication which it may receive from the base station controller 21. The paging channel processor 30 computes the slot and frame number of the current frame in the paging channel. The paging channel processor 30 then sends to the CDMA modulator driver 32 a sufficient number of frames of null messages to keep the CDMA modulator driver 32 processing to the end of the current time slot, which is the slot during which the paging channel processor 30 received a command to begin operating the paging channel and during which the initialization routine is being carried out. In this way, when the CDMA modulator driver 32 next requests a new frame of data, the new frame is the first frame in the next slot. After the paging channel processor 30 has synchronized itself with the slot boundary by sending the null messages and computing the next slot number, the paging channel processor 30 sets the next message pointer to the start time of the first frame in the next slot.

Figure 7:
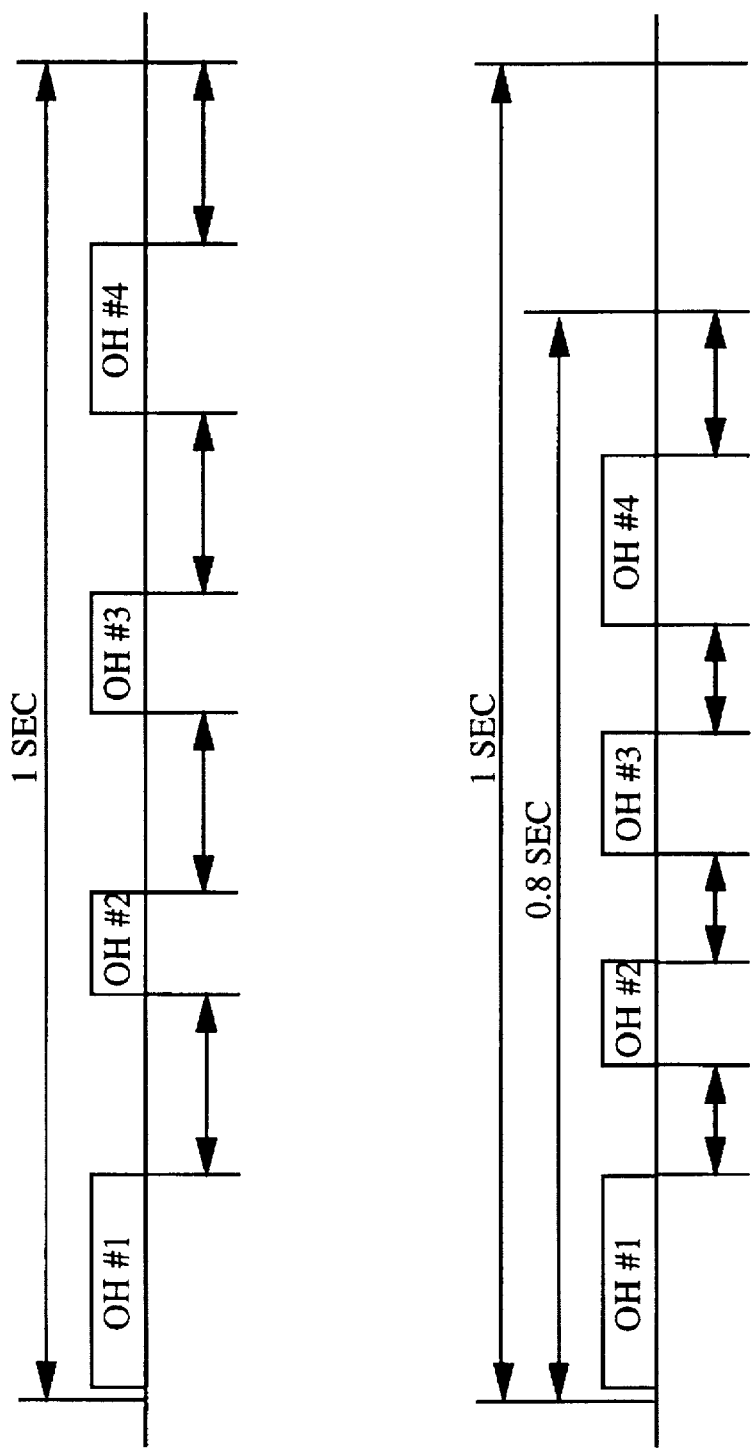
FIG. 7 is a representation of overhead message prescheduling carried out by the paging channel processor.

As noted above, the paging channel processor 30 sends overhead messages. The paging channel processor 30 builds and pre-schedules such overhead-type messages during the initialization routine. In pre-scheduling the overhead messages, the message scheduler 66 determines the number of overhead messages to be transmitted during one second of time and determines the amount of time that such overhead messages require for transmission as determined by the number of bits in the messages and the transmission data rate. The paging channel processor 30 may determine the message time because it knows how many bits each overhead message requires and it knows the paging channel data rate. Once the paging channel processor 30 knows how many bits per second are required for the overhead messages, it determines how many bits are left over and schedules the overhead messages such that they are evenly distributed over the one second time interval. The evenly distributed overhead messages are illustrated in time line 90 of FIG. 7. The paging channel processor 30 then provides a predetermined reserve factor in the one second overhead message repeat interval. That is, in the preferred embodiment, the paging channel processor provides a twenty percent reserve factor and therefore schedules the overhead messages evenly within a 0.8 second interval. The evenly distributed overhead messages with the 20% reserve factor are illustrated in time line 92 of FIG. 7. Note that the one second and 0.8 second interval times are exemplary and other intervals may be used consistent with the present invention.

PAGING CHANNEL PROCESSOR NORMAL OPERATION—MESSAGE SCHEDULER

During normal operation of the paging channel processor 30, the input processor 60 receives single input messages and also new versions of overhead messages which it processes as described above. The message scheduler 66 is invoked when the paging channel processor 30 receives a frame request from the CDMA modulator driver 32. First, the message scheduler 66 computes how much time it can spend scheduling and formatting messages. It computes this time based on its knowledge of the current system time (the system time when it was invoked) and the time by which the CDMA modulator driver 32 must have the next frame so that no discontinuity in the steady stream of frames occurs.

Figure 8:
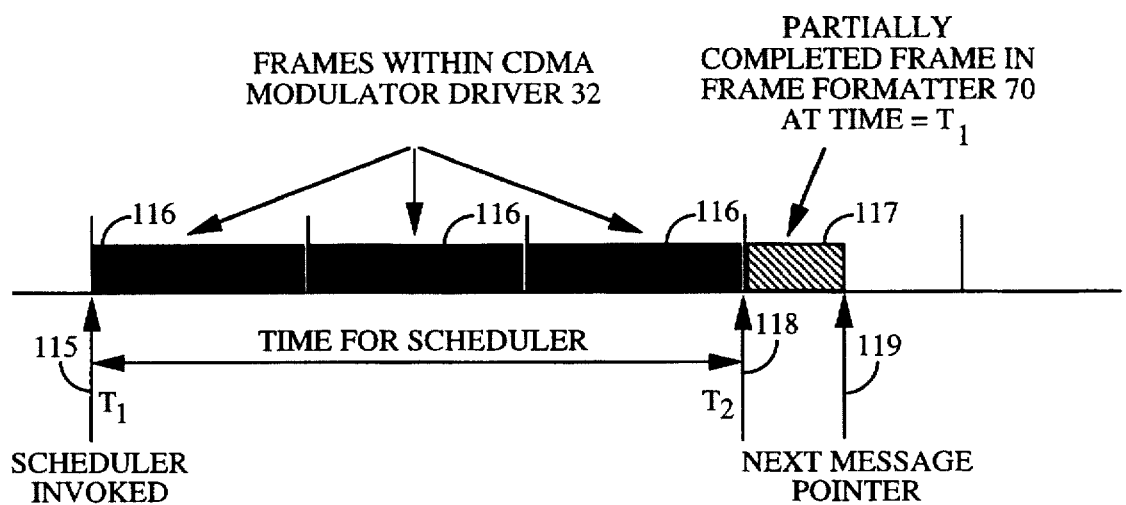
FIG. 8 is a representation of complete and partial frame data used to illustrate the time out calculation.

Calculation of the time out value is illustrated in FIG. 8 in which the message scheduler 66 is invoked at a first time $t_1$ as indicated by arrow 115. FIG. 8 is a snap shot of a time line illustrative of the frames within the CDMA modulator driver 32 and a partial frame within the frame formatter 70. Each frame of data is passed to the CDMA modulator 48 from the CDMA modulator driver 32 when the current time passes the left most edge of the block. Time is advancing left to right. In FIG. 8, the three blocks 116 represent the three frames currently in queue within the CDMA modulator driver 32 waiting to be sent to the CDMA modulator 48. Block 117 represents a partially complete frame in the frame formatter 70 at the time which the scheduler is invoked, $t_1$. Note that the new message pointer at arrow 119 illustrates the earliest time at which the next message which is scheduled will be transmitted. The arrow 118 marks the time $t_2$ by which the next frame of date including the partial frame 117 must be passed to the CDMA modulator driver 32 so that the CDMA modulator driver 32 does not run out of frames to pass to CDMA modulator 48. The time $t_2$ marked by arrow 118, corresponding to the time out for the message scheduler 66, is the end of the last frame within the CDMA modulator driver 32.

The message scheduler 66 operates as a state machine with three different states: a start of slot state, a slotted state, or an unslotted state. The message scheduler 66 is in the start of slot state when the next message to be scheduled is the first message corresponding to a new slot. The message scheduler 66 is in the slotted state when it schedules messages from the slotted input queue 62. The message scheduler 66 is in the unslotted state when it schedules messages from the unslotted input queue 64. During both slotted and unslotted states, the message scheduler 66 examines the overhead messages queue 67 for the pre-scheduled overhead messages.

In the frame formatter 70, groups of message are assembled into frames of data for transmission and the frames are passed to the CDMA modulator driver 32. If there are an insufficient number of messages from the input message queues 62, 64 and the overhead messages queue 67 to produce at least one frame, the message scheduler 66 may command the frame formatter 70 to fill a partially filled frame with one or more null messages or message scheduler 66 may allow frame formatter 70 to hold the partially complete frame so that the next scheduler processing cycle adds more information bearing messages to the partially filled frame. At the end of a scheduler invocation when the frame formatter 70 has formatted all messages scheduled by the message scheduler 66, the message scheduler 66 checks to see how many frames are on the queue of the CDMA modulator driver 32 and sets the frame request threshold to half of the current number of frames.

Figure 9:
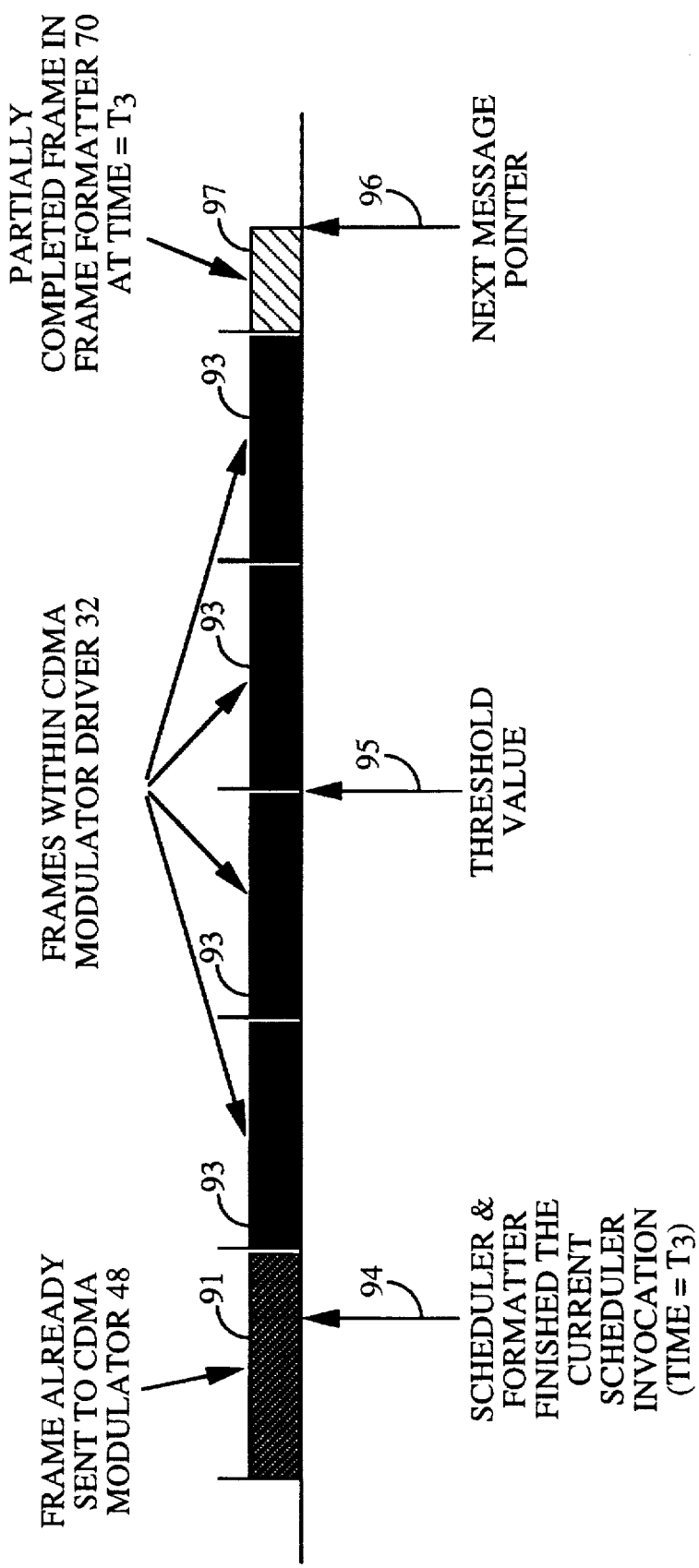
FIG. 9 is a representation of complete and partial frame data used to illustrate the threshold value calculation for the frame request.

The operation of the threshold setting is illustrated in the time line in FIG. 9. FIG. 9 is a snap shot of a time line illustrative of the frames within CDMA modulator driver 32, frames which are within the frame formatter 70, and frames which have been sent to the CDMA modulator 48. Each frame of data is passed to the CDMA modulator 48 when the current time passes the left most edge of the block. Time is advancing left to right. In FIG. 9, the shaded block 91 represents the frame which was most recently passed to the CDMA modulator 48. The next four blocks 93 represent the four frames currently in queue within the CDMA modulator driver 32 waiting to be sent to the CDMA modulator 48. The block 97 represents a partially complete frame in the frame formatter 70 at the time when message scheduler 66 finished the most recent invocation, $t_3$. Note that the new message pointer at arrow 96 illustrates the earliest time at which the next message which is scheduled will be transmitted. The arrow 94 marks the time $t_3$ when message scheduler 66 finished the most recent invocation. Note that at time $t_3$ there are four frames on the CDMA modulator driver queue and thus the "new threshold value" data structure is 2. At this point, the message scheduler 66 sits idle from the time $t_3$ until the time corresponding to the arrow 95 indicative of the threshold value. During this time, single messages continue to accumulate in their respective queues and overhead messages continue to circulate and become ready for transmission.

At the end of a scheduler invocation, the number of frames queued in CDMA modulator driver 32 is indicative of the message traffic load level. If the load is low, very few frames are queued and thus the scheduler does not wait for very long to begin processing again. When the message traffic is high and the paging channel is heavily loaded, there are a larger number of messages queued at the end of each scheduler invocation. When message traffic is low, the scheduler automatically reduces the allotted time for scheduling messages to minimize the scheduling delay. When message traffic is high, the scheduler automatically increases the allotted time for scheduling the messages so that the corresponding increase in time required to schedule the messages is accommodated.

Note the difference between the time out value as illustrated in FIG. 8 and the threshold value as illustrated in FIG. 9. The time out value is the maximum time for the current scheduler processing cycle as calculated as the current scheduler processing cycle begins. The threshold value sets the amount of time that lapses between the end of one scheduler invocation and the beginning of the next invocation as determined at the end of the preceding scheduler invocation.

As noted above, messages on the slotted message input queue 62, unslotted message input queue 64 and overhead message queue 67 are associated with time constraints that specify an earliest start time (EST) at which a message may be sent and that specify a latest end time (LET) at which the message transmission should be completed. It should be clear that such constraints apply to the corresponding OTA message that contains the single message. For a combined OTA message that includes multiple single messages, the OTA message EST is set to the latest EST of the single messages and the OTA message LET is set to the earliest LET of the single messages.

Figure 10:
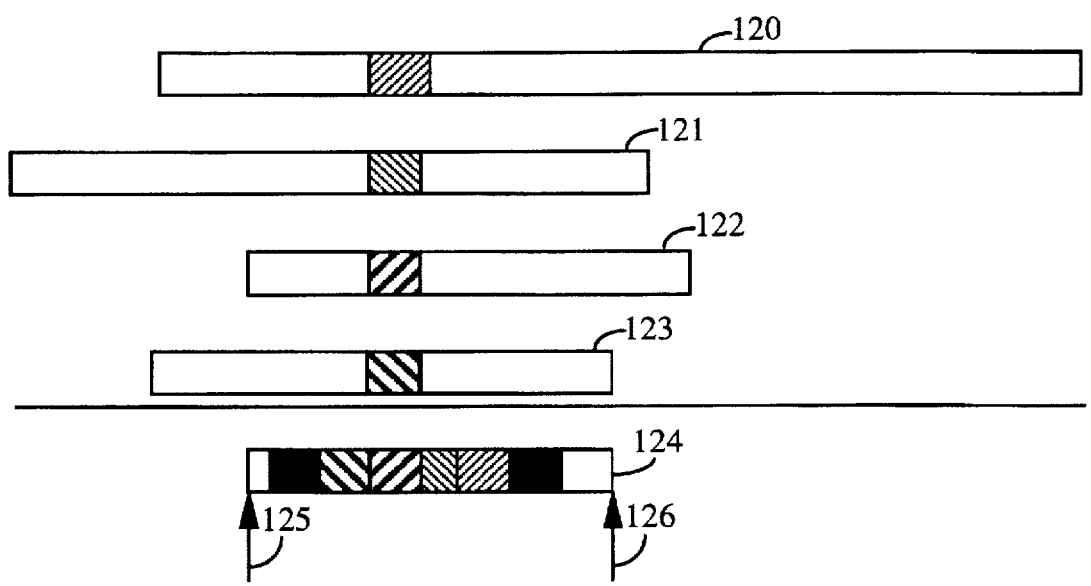
FIG. 10 is a representation of several input single messages having different earliest start times and latest end times that illustrates how several single messages can be combined into a combined OTA message.
Figure 11A:
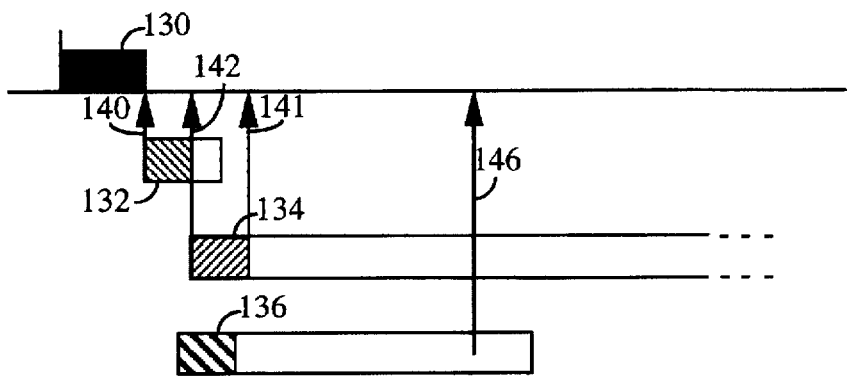
FIG. 11A, FIG. 11B, and FIG. 11C illustrate message scheduling according to the present invention.
Figure 11B:
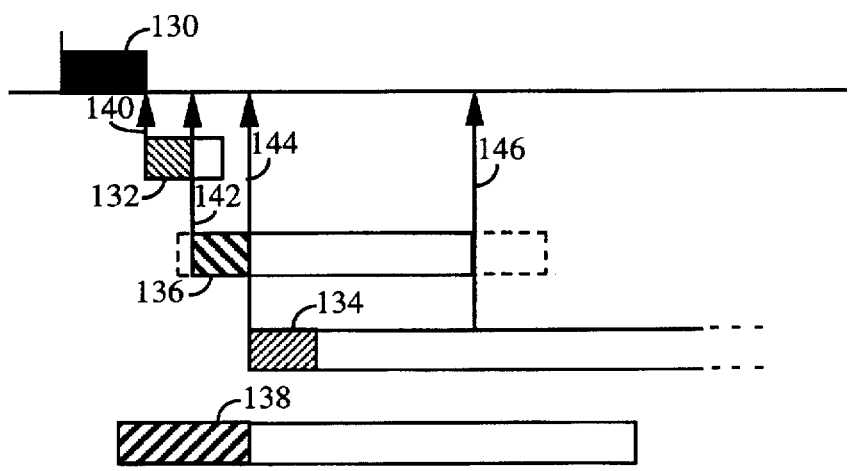
Figure 11C:
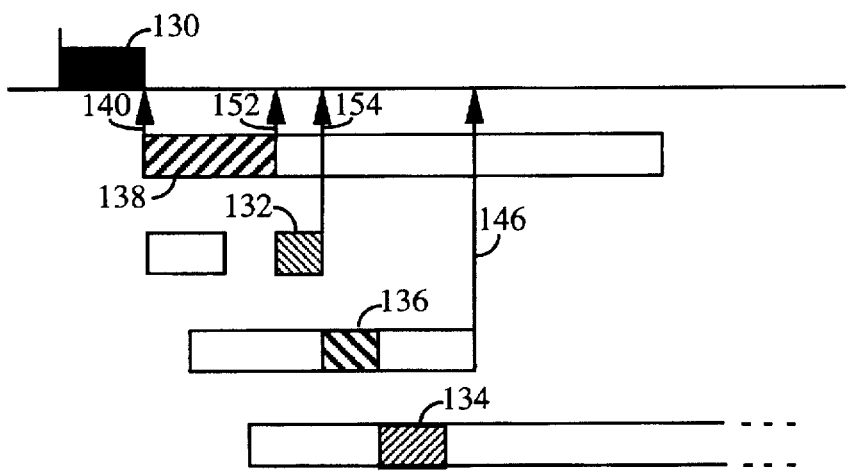

This principle is illustrated in the time line of FIG. 10 in which time runs from left to right. FIG. 10 shows first, second, third, and fourth single messages, respectively designated 120, 121, 122, and 123, that are being combined into one OTA message designated 124. The left edge of each message represents the EST of the message and the right edge of each message represents the LET of the message. The actual length of each message 120, 121, 122, and 123, is indicated by the width of the shade block. As can be seen from FIG. 10, the EST of the combined OTA message is indicated by arrow 125 and is set to the latest EST of any one of the single messages which in this case corresponds to the EST of the message 122. The LET of the combined OTA message 124 as indicated by arrow 126 is set to the earliest LET of any one of the single messages in this case the LET of message 123. The blocked blocks in combined OTA message 124 indicate the header and trailer bits In accordance with the present invention, messages are scheduled using a temporary data structure—namely the combined messages/scheduling data block 68. The combined messages/scheduling data block 68 temporarily holds messages until the end of each scheduler processing cycle when the messages are ready to be formatted by frame formatter 70. FIG. 11A, FIG. 11B, and FIG. 11C are time line representations of the transmission time of data stored in the combined messages/scheduling data block 68 and the frame formatter 70. Throughout FIGS. 11A–C, the solid block 130 represents a partially built frame which is stored in the frame formatter 70 to which other messages are to be added. Note that arrow 140 indicates the next message pointer which is the time at which the first message added during this scheduler processing cycle will begin. FIG. 11A shows two OTA messages already stored in the combined messages/scheduling data block 68 as represented by diagonally striped blocks 132 and 134. For each type of OTA message the following message data is kept in the combined messages/scheduling data block 68: a flag indicating if the message is a combined message or a simple OTA message, the OTA message start time, the OTA message end time, the OTA message latest end time, the current length of the OTA message, and the queue of each single message for the combined OTA messages. For each of the combined messages, the single messages corresponding to the combined message are stored in a queue within the combined messages/scheduling data block 68. The corresponding queue must be noted so that the messages can be recalled when the OTA message is formatted and sent to the frame formatter 70.

As was described above, in the CDMA system, there are seven OTA message types to be scheduled over the paging channel. In the preferred embodiment, only one message of each type is assembled per scheduler processing cycle. In the preferred embodiment, within one scheduler processing cycle, the message scheduler 66 schedules the OTA messages in the following order: channel assignment message, order message, data burst message, authentication challenge message, SSD update message, feature notification message, and page message. In actuality, the order of message processing is arbitrary so long as the page message is the last. In the preferred embodiment, sending the page message last with a later LET than the other messages ensures that a slotted page message may be transmitted at least once per slot and the addition of an empty slotted page message does not effect the LET times of the other messages in the message set as explained in detail below.

At the beginning of each scheduler processing cycle (before the messages 132 and 134 of FIG. 11A have been added to the combined messages/scheduling data block 68), the combined message/scheduling data 68 is initialized and each of the entries for each OTA message type is cleared of its previous value. In particular, the start of each OTA message type is set to the time when the next message to be scheduled is to start as referenced by the next message pointer. The end time of each OTA message is set to the same value as its start time. The length of each OTA message is set to zero. The LET of each OTA message is set to the second to last half-frame of the current slot, except for the page message, which has an LET set to the middle of the next slot. Remember that the slotted page message has an additional field which indicates that there is at least one more paging channel message associated with the current slot which indicates that the mobile units in slotted mode should continue to monitor the paging channel even past the end of the current slot if necessary. Also remember that the slotted page message may be sent even if the message start time is equal to the message end time at the end of the scheduling processor cycle. Because the page message is last in the sequence, the added length of the empty slotted page message does not effect the parameters associated with the other messages.

The message scheduler 66 may not move the LET of any OTA message to a later time. Rather, the message scheduler 66 may only move the LET of an OTA message earlier in time. Thus, there is always sufficient time to include at least one slotted page message corresponding to the current slot, regardless of other messages that are also scheduled during the slot. The message scheduler 66 does not permit the end of an OTA message to extend past the second to last half-frame of a slot except for the slotted page message which can safely start in the last half-frame and end by the middle of the next slot. Also, setting the LET of the slotted page message to the middle of the next slot provides the flexibility to "borrow" some time from the next slot if there are many messages corresponding to the current slot.

At the beginning of each scheduler processing cycle, each message type has an empty hold spot. Referring again to FIG. 11A, if the next single message to be scheduled has the earliest start time specified and if that start time is later than the end of the last message already scheduled (as indicated by arrow 141 in FIG. 11A), it is too early to schedule the message and therefore the message scheduler 66 does not schedule it. If the first message in the input message queue 62, 64 is of a type which corresponds to the simple messages which cannot be combined and a single message of this type has already been scheduled during the current frame, the message scheduler 66 does not schedule the message. If none of the preceding conditions is met, then the message scheduler 66 provisionally adds the input message to the temporary data structure.

In FIG. 11A two messages 132 and 134 have already been scheduled. Assume that message 132 is an order message and that 134 is a combined page message having entries corresponding to at least two mobile units. Each message in FIGS. 11A–11C is constrained in time by the outlined rectangle similar to the method used in FIG. 10 wherein the left side of which represents the EST in time, the right hand side of which represents the LET of the message as scheduled. The shaded portion of each message represents the actual message length. Thus, for example, the combined page message 134 has an EST constrained by the latest occurring one of the scheduled start time (arrow 142) or the EST of each one of the single messages used to create it. In FIG. 11A both order message 132 has an EST equal to the next message pointer as indicated by arrow 140. The end of current half frame is indicated by arrow 146. Let us also assume that the current half frame corresponds to the second to last half in the current slot. The combined page message 134 has an LET which extends through the second to last half frame, through the last half frame, and into the next time slot (not shown). The order message 132 has an LET just slightly later in time than the end of the message as currently scheduled.

In FIG. 11A, the message 136 is the next message to be scheduled. The message 136 has the EST and LET as indicated and is an SSD message. In the preferred embodiment, the SSD message type is scheduled between the order and page messages. Therefore, the SSD message 136 is shown as scheduled between the order message 132 and the page message 134 in FIG. 11B. Note that the EST of the scheduled SSD message 136 is the end time of order message 132 and the EST of the page message 134 has been moved from arrow 142 to arrow 144. Also note that the LET of the SSD message 136 has been moved up in time to the end of the current half frame as indicated by arrow 146 because the current half frame is the second to last in this slot. The previous EST and LET of the SSD message 136 are shown in dashed lines for the illumination of the reader.

The scheduling process schedules the message provisionally as shown in FIG. 11B and then it checks the EST and LET of all effected messages to see that no parameter has been violated. In this case no parameters have been violated. If message 136 had been a page message, it would have been added to the page message 134 and would have therefore increased the length of page message 134. In the preferred embodiment, the message length of each OTA message is constrained to a maximum length of 1185 bits and therefore, the length of the new page message 134 incorporating the new message 136 would be another parameter that was checked by the scheduler processing. Because in this case no parameter was violated, the SSD message 136 is allowed to remain as scheduled in FIG.11B and the next message 138 is now provisionally added to the combined messages/ scheduling data block 68.

Now assume that the message 138 is a channel assignment message. The channel assignment message 138 is provisionally added before the order message 132 as shown in FIG. 11C. Of course the start time of the order message 132, page message 134, and SSD message 136 are skewed by the length of the channel assignment message 138. Note what has happened to the order message 132. Its end time has slipped past the LET thus violating a necessary parameter. Thus, the channel assignment message 138 would not be scheduled during this scheduler processing cycle. The combined messages/scheduling data block 68 would be returned to the condition shown in FIG. 11B and message 138 would be returned to the queue from which it came. The subsequent action taken by the scheduler processing cycle is described below.

OPERATION OF THE MESSAGE SCHEDULER IN THE START OF SLOT STATE

Figure 13:
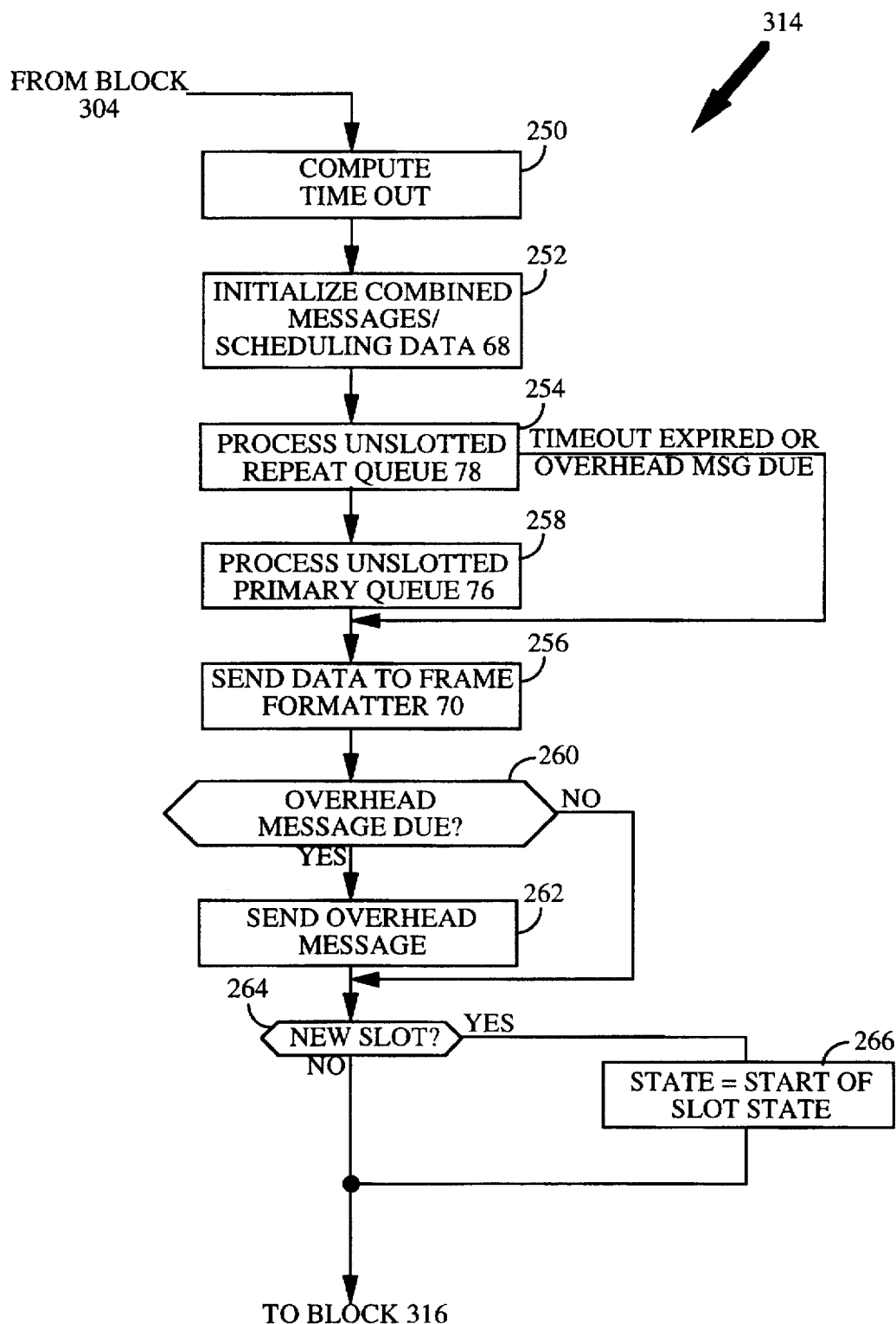
FIG. 13 is a flow diagram that illustrates the operation of the message scheduler in the unslotted state.
Figure 14:
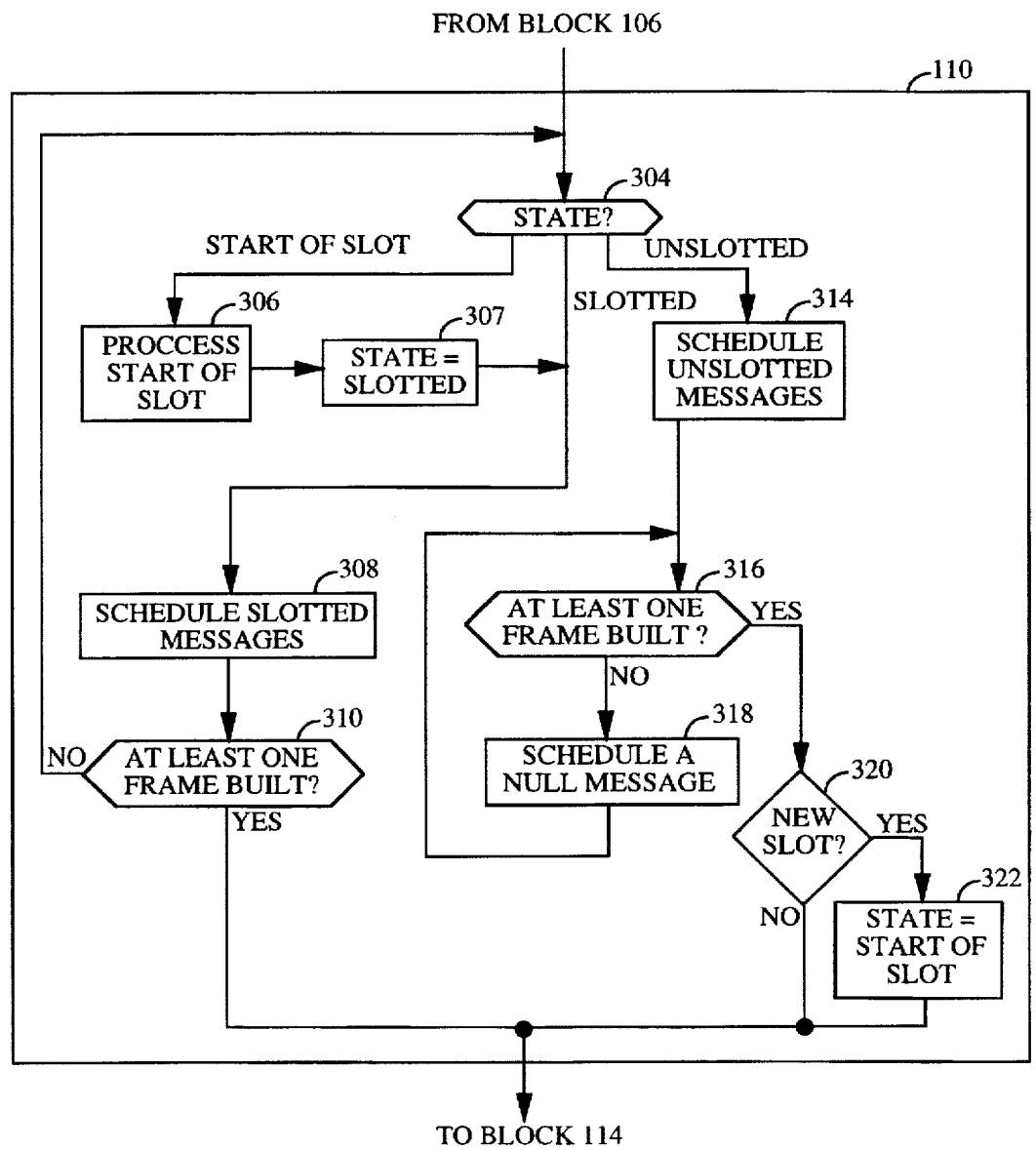
FIG. 14 is a flow diagram that illustrates the operation corresponding to scheduler invocation in FIG. 5.

FIG. 14 shows a detailed block diagram of the block 110 of FIG. 5. The entire flow of FIG. 14 is explained in detail below. The reference to FIGS. 5, 12, 13 and 14 is made so that the reader can note the corresponding components in the four figures. The following operations correspond to the block 306 of FIG. 14 labeled "Process start of slot."

If the message scheduler 66 is invoked when the next message to be scheduled will be the first message corresponding to the next slot, the message scheduler 66 is in the start of slot state and must perform the associated operations. First, the initial message must be synchronized. That is, the message must begin immediately after an SCI bit of the half-frame. As described above, because messages can cross half-frame, full frame, and slot boundaries, it can be that the last OTA message from the prior slot can extend into the current slot. To synchronize the current message, the message scheduler 66 moves the next message pointer to the second bit of the next half-frame and the frame formatter 70 adds pad bits following the end of the last OTA message to fill the remainder of the prior half frame. No null messages need to be sent if the last OTA message ends at the last bit of a half frame.

The next operation in the start of a slot state is for the message scheduler 66 to reorder the slotted message input queue 62. Given the current slot number, the message scheduler 66 removes single messages from the front of primary slotted message input queue 72 and repeat slotted message input queue 74 if the single messages have a designated slot number that is less than the current slot number. For each simple slotted message, the message scheduler 66 computes the next slot during which the simple slotted message may be sent and puts the simple slotted message back in the respective queue in the right place.

For example, assume the current slot number is 2041 (out of 2047) and that the following messages are in the primary slotted message queue 72 (listed from front to back):

| Message | Slot number | Slot repeat interval |
|---------|-------------|----------------------|
| A | 2040 | 128 |
| B | 2040 | 16 |
| C | 2040 | 2 |
| D | 2041 | 4 |
| E | 1 | 32 |

Because the current slot time is 2041, the message scheduler would remove input messages A, B, and C from the front of the queue. The next slot during which message A can be sent and received by its mobile unit is 2040+128=2168, which equates to 120 after modulo(2048)=2168−2048. Similarly, the next slot during which message B can be sent is 8, and the next slot for message C is 2042. Therefore, the message scheduler will reorder the slotted queue as follows:

| Message | Slot number | Slot repeat interval |
|---------|-------------|----------------------|
| D | 2041 | 4 |
| C | 2042 | 2 |
| E | 1 | 32 |
| B | 8 | 16 |
| A | 120 | 128 |

This completes the start-of-slot operation of the message scheduler 66. The scheduling state is now "slotted" as indicated by block 307 of FIG. 14.

OPERATION OF THE MESSAGE SCHEDULER IN THE SLOTTED STATE

Figure 12:
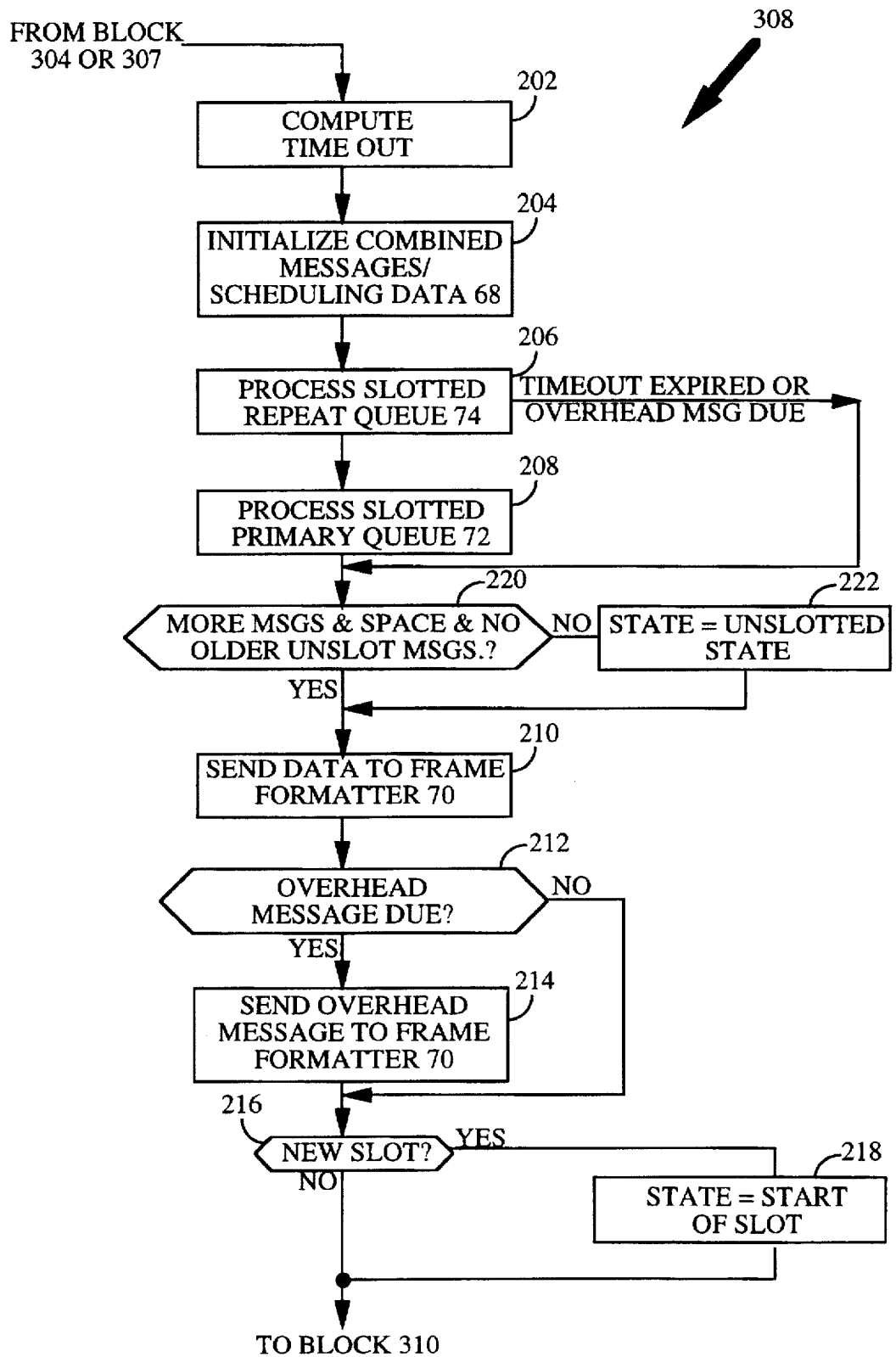
FIG. 12 is a flow diagram that illustrates the operation of the message scheduler in the slotted state.

The slotted state of message scheduler operation is represented by block 308 of FIG. 14 and is illustrated in detail in FIG. 12. In the slotted state, the time out value is computed as described above, block 202. Next, the message scheduler 66 initializes the combined message/scheduling data 68 which keeps track of the OTA message parameters detailed above such as initialization of start and end times as well as the EST and the LET of each message type. At this point, of course, the combined message/scheduling data 68 is empty. This step is represented by the flow diagram box numbered 204.

The message scheduler 66 first considers single messages from the slotted queue. The reason that the message scheduler 66 begins with the slotted messages rather than the unslotted messages is that the mobile unit operate in slotted mode to conserve power. One mechanism used to conserve power is the slotted page message which indicates that no more slotted messages are going to be transmitted corresponding to the current slot. Upon receipt of such a message a mobile unit operating in slotted mode and monitoring the current slot may stop monitoring the paging channel for the reminder of the slot time thus resulting in even greater power savings. Therefore, within each slot, the sooner the indication that all slotted messages corresponding to the slot have been sent—the less power consumed by the mobile units operating in slotted mode and monitoring the slot. Hence, the message scheduler 66 schedules the slotted messages first within each slot. The message scheduler 66 also begins with the repeat slotted message input queue 74 rather than primary slotted message input queue 72 because the entries in repeat slotted message input queue 74 are repeat messages and therefore necessarily constrained by EST and LET. When a message has been transmitted once it is more important to ensure optional system performance that the message be repeated to ensure that it is received than it is fill the system with a series of messages that should be repeated but cannot be due to a system overload condition.

Messages in the slotted repeat queue are sorted first by slot number and then, within each slot, by their earliest start time (EST). If a single message which is to be repeated does not include EST and LET constraints when it is received from the base station controller 21, after the first transmission the paging channel processor 34 sets these time constraints when the message is added to the repeat slotted message input queue 74.

The message scheduler 66 considers messages from the repeat slotted message input queue 74 one by one, as described above with reference to FIG. 11. That is, if the single message can be added to the combined messages/scheduling data block 68, the message scheduler 66 adds the single message and continues scheduling. If the single message cannot be added, the action taken by the message scheduler 66 depends on the reason that the single message cannot be added.

If the time at which the message would be transmitted if added to the combined messages/scheduling data block 68 is earlier than the message EST, the message scheduler 66 puts the message into an auxiliary queue of the combined message/scheduling data block 68 so that it can be later replaced on the queue from which it came and message scheduler 66 continues scheduling the repeat slotted message input queue 74. If the single message cannot be added because there already is a single message of the same type scheduled this scheduler processing cycle and the corresponding OTA message type is a simple one which can contain only one single message, the message scheduler 66 places the single message back into the repeat slotted message input queue 74 and stops scheduling the repeat slotted message input queue 74. The reason each scheduler processing cycle accommodates only one of each type of message is for ease of implementation. As noted above, the combined messages/scheduling data block 68 at the beginning of each scheduler processing cycle is initialized and each message type has the single set of data entries noted above. As the messages are scheduled as shown with reference to FIG. 11, the parameters are simply updated with new values. If a second message corresponding to a message type that cannot be a combined message according to the standard (i.e., IS-95), there is no manner in which to accommodate the new parameters. Therefore, the scheduler processing cycle simply stops processing the repeat slotted message input queue 74 and the second message is replaced on the repeat slotted message input queue 74 from which it is processed during a subsequent scheduler processing cycle. Note that there can be multiple scheduler processing cycles corresponding to a single frame and that the transmitted output corresponding to one scheduler processing cycle may abut in time the transmitted output corresponding to the next scheduler processing cycle so that the time at which the second message is scheduled is not greatly delayed. This aspect is another one of the efficient uses of the available resources associated with the preferred embodiment of the current invention.

If the single message cannot be added because the resulting combined OTA message would be too long, the message scheduler 66 puts the single message back into the slotted repeat queue 74 and stops scheduling the repeat slotted message input queue 74. This result would occur if the single message was added to an existing combined OTA message and the addition of the new message caused the combined OTA message to exceed its maximum message length. If adding the single message causes the OTA message to end past the LET of the added single message, the message scheduler 66 discards the message and stops scheduling the repeat slotted message input queue 74. In discarding the message a fault indication is sent to the base station controller 21 as noted above. Finally, if adding the single message causes violations of time constraints for other OTA messages, the message scheduler 66 puts the single message back into the slotted repeat queue 74 and stops scheduling the repeat slotted message input queue 74. (The situation in which the LET of another message is violated is shown explicitly in FIG. 11C.) If scheduling of the repeat slotted message input queue 74 is stopped for any of the above reasons, the process is said to be halted due to message stimulus.

Continuously while the message scheduler 66 considers new single messages from the input queues 62 and 64, the message scheduler 66 checks for a time out condition (as described above) and monitors the next overhead message EST. As each message is added, the message scheduler 66 compares the actual end time of the last OTA message with the EST of the first message in the overhead message queue 67. The message scheduler stops processing the repeat slotted message input queue 74 if the time out expires or an overhead message is due.

If the scheduling process in block 206 is halted due to an expired time out, or because an overhead message is due, the processing of the primary slotted message input queue 72 block 208 is by-passed for this scheduler processing cycle as shown in FIG. 12. When the message scheduler 66 stops processing the slotted repeat queue 74, it places all messages from the auxiliary queue into the slotted repeat queue 74.

If scheduling of the repeat slotted message input queue 74 is halted due to message stimulus or because the repeat slotted message input queue 74 does not contain any more messages for the current slot, the message scheduler 66 begins to process the primary slotted message input queue 72 as shown in block 208 of FIG. 12. When the message scheduler 66 stops processing the repeat slotted message input queue 74, it places all messages on the auxiliary queue into the repeat slotted message input queue 74.

When the message scheduler 66 begins processing the primary slotted message input queue 72, it carries out the same processing steps described above with reference to FIG. 11 and the same processing steps as for the repeat slotted message input queue 74 as described above with reference block 206. That is, the message scheduler 66 considers messages from the primary slotted message input queue 72 and one by one adds the single messages if they can be added without violating any of the message constraints specified. When processing the primary slotted message input queue 72, the message scheduler 66 checks one additional stopping condition, namely, the message scheduler 66 checks the arrival time of the single slotted message being scheduled in the slotted primary queue 72 to determine if it is later than the arrival time of the first single message in the primary unslotted message input queue 76. If the arrival time is later, the message scheduler 66 does not schedule the single slotted message and stops scheduling. In this way, the message scheduler 66 avoids the situation where unslotted messages cannot be scheduled because they are blocked by slotted messages. This is another important feature of the present invention. No matter what the stimulus of the termination of scheduling the slotted message input queue 72—time out expiration, overhead message due, message stimulus or older unslotted message—the flow continues from block 208 to block 220.

At this point for the reasons noted below, the message scheduler 66 must determine whether it is going to remain in the slotted state or enter the unslotted state. To make the determination the message scheduler 66 examines three criteria. First note whether or not block 208 was exited because the arrival time of a single slotted message being scheduled from the slotted primary queue 72 was older than the first single message in the primary unslotted message input queue 76. If so, the state is changed to unslotted, as indicated by block 222, so that the older messages can be scheduled. If block 206 or 208 were exited for other reasons, the message scheduler 66 checks to see if more messages corresponding to the current slot are stored within slotted message input queue 62. If there are none, the state is changed to the unslotted state as indicated by block 222. If more message corresponding to the current slot exist, the message scheduler 66 examines the current slot to see if there is space for more slotted messages in the current slot. To determine if there is space, the message scheduler 66 takes the end time corresponding to the current message set and adds the length of the first message in the overhead message queue 67 if the message is due. If the total does not extend into the last half frame of the current slot, space to send another slotted page message exits and the state remains slotted and the flow continues to block 210.

At this point in the flow several decisions need to be made concerning the slotted page message. Each slotted page message contains a 'more pages' field which indicates whether or not more slotted messages corresponding to the current slot are subsequently going to be transmitted corresponding to the current slot. In the preferred embodiment, if the page message corresponding to the current message set is the last slotted page message in the current paging channel slot, the field shall be set to '0' otherwise the field is set to '1'. Upon receipt of a slotted page message having a 'more pages' field set to '0', each mobile unit operating in slotted mode and monitoring the current slot may stop monitoring the paging channel. This flag is set based on whether the current state is slotted or unslotted.

If the message scheduler 66 has entered the unslotted state, a page message must be sent with the 'more pages' field set to '0.' This is true even if there are currently no single messages in the page message queue. If there is a nonempty page message scheduled, the 'more pages' bit is simply set to '0.' If no page message is currently scheduled, an empty slotted page message is scheduled with the 'more pages' bit set to '0.' This serves the dual purpose of guaranteeing that at least one page message is sent during each slot so that any overhead sequence number update is included in every slot as explained above. If the message scheduler 66 is in slotted state and a nonempty page message exits, the 'more pages' bit is set to '1.' If the message scheduler 66 is in the slotted state and the page message is empty, no slotted action need be taken and no page message need be sent.

After the page message has been updated according to the preceding paragraph, the message scheduler 66 provides the data in the combined messages/scheduling data block 68 to the frame formatter 70, as represented by the block 210. When the data in the combined messages/scheduling data block 68 has been passed to the frame formatter 70, it is said that one scheduler processing cycle is complete.

When the frame formatter 70 finishes formatting the messages, the message scheduler 66 checks to determine if an overhead message is due as represented by block 212. If an overhead message is due, the message scheduler 66 provides the overhead message data to the frame formatter 70, as indicated by block 214. If the message scheduler 66 has scheduled so many messages that all frames for the current slot are filled as indicated by the next message pointer, the message scheduler 66 changes its state to the start-of-slot state as indicated by blocks 216 and 218. In this case, no unslotted messages are scheduled during this slot. For the reasons noted above, rather than begin to fill the next slot with unslotted messages, the message scheduler 66 gives preference to the slotted messages corresponding to the next slot. Thus by entering the start of slot state, the slotted messages corresponding to the next slot are scheduled next. The schedule slotted message block 308 ends and operation continues with block 310 of FIG. 14.

OPERATION OF THE MESSAGE SCHEDULER IN THE UNSLOTTED STATE

The unslotted state of message scheduler operation is represented by block 314 of FIG. 14 and is illustrated in detail in FIG. 13. In the "unslotted" state, the time out value is computed as described above, block 250. Next, the message scheduler 66 initializes the combined message/ scheduling data 68 in the same manner as it does in the slotted state, block 252.

After initialization, the message scheduler 66 begins scheduling messages from the unslotted message input queue 64. Scheduling proceeds in the same manner as it does with the slotted message input queue 62. As represented by block 254, first, the message scheduler 66 considers single messages from the repeat unslotted message input queue 78. Messages in repeat unslotted message input queue 78 are sorted by EST. Again, the paging channel processor 30 sets EST and LET constraints for each of these messages after the messages have been transmitted at least once, even if the messages had no such constraints when received from the base station controller 21. Therefore, all messages in the unslotted repeat queue 78 have EST and LET constraints. The message scheduler 66 considers messages from the repeat unslotted message input queue 78 as described above for the slotted operation.

If a single message from the repeat unslotted message input queue 78 can be added to the combined messages/ scheduling data block 68, the message scheduler 66 adds it and continues scheduling messages. If a single message cannot be added, the action taken by the message scheduler 66 again depends on the reason the single message cannot be scheduled in the same manner as described above in relation to the repeat slotted message input queue 74.

While the message scheduler 66 schedules single messages from the repeat unslotted message input queue 78, it continuously checks for a time out condition and for overhead messages in as similar a manner as it does in slotted mode. The message scheduler 66 stops processing the repeat unslotted message input queue 78 if the time out condition occurs or if an overhead message is due, and proceeds to block 256. If the message scheduler 66 stops processing the repeat unslotted message input queue 78 for any other reason, the message scheduler 66 next begins to process the primary unslotted message input queue 76 as indicated by block 258. Either way, when the message scheduler 66 stops processing the repeat unslotted message input queue 78, the message scheduler 66 places all messages from the auxiliary queue back into the repeat unslotted input queue 78.

The message scheduler begins processing the unslotted primary input queue 72, using the same processing steps as described above for the repeat slotted message input queue 74, as represented by the flow diagram box numbered 258. The combined messages/scheduling data block 68 passes its data to the frame formatter 70 as represented by block 256 and another scheduler processing cycle is completed.

When the frame formatter 70 finishes formatting the data into frames, the message scheduler 66 checks to determine if an overhead message is due, as indicated by block 260. If an overhead message is due, the message scheduler 66 passes the overhead message data to the frame formatter 70, as indicated by block 262. If the next message pointer indicates the next slot has been entered, the state is changed to the start of slot state, block 266. Otherwise, the state remains in unslotted state. Either way the flow continues to block 316 of FIG. 14.

INVOCATION OF SCHEDULING Referring now to FIG. 14 the remainder of the scheduler invocation is disclosed. Within block 110, blocks 306, 307, 308, and 314 have already been discussed above. Once a frame request has been received from CDMA modulator driver 32, the state is determined as indicated in block 304. When block 304 is entered from block 106 or from block 310, the state may be start of slot, slotted or unslotted.

Upon exiting the schedule slotted messages block 308 corresponding to FIG. 12, if at least one frame was generated for the CDMA modulator driver 32 since the block 304 was entered corresponding to the current invocation, the message scheduler 66 exits scheduler invocation, block 110, and the flow continues to block 114 of FIG. 5. If there were an insufficient number of messages to fill at least one frame, the message scheduler 66 continues its operation in the current scheduler invocation. Upon exiting the schedule unslotted messages block 314 corresponding to FIG. 13, if at least one frame was not generated for the CDMA modulator driver 32 since the block 304 was entered corresponding to the current invocation, block 316, the message scheduler 66 schedules a null message as indicated by block 318. This loop continues until the frame formatter 70 sends at least one frame to the CDMA modulator driver 32. If at least one frame was built and so many messages have been scheduled that all frames for the current slot are filled as indicated by the next message pointer, the message scheduler 66 changes its state to the start-of-slot state as indicated by blocks 316, 320 and 322. If at least one frame was built but the current slot is not filled as indicated by the next message pointer, the message scheduler 66 remains in the unslotted state as indicated by blocks 316, and 320.

OPERATION OF THE FRAME FORMATTER

The operation of the frame formatter 70 is described as follows. The frame formatter 70 receives a request from the message scheduler 66 to format messages into frames. It receives data from the combined messages/scheduling data block 68 (FIG. 4) from which it builds data frames. When a data frame is finished, the frame formatter 70 sends the frame to the CDMA modulator driver 32 for transmission. The frame formatter 70 also can receive a request from the message scheduler 66 to synchronize a capsule, format a null message, or format an overhead message.

When the frame formatter 70 receives the request to synchronize a message capsule, the frame formatter 70 checks to determine if the capsule is already synchronized. A capsule is synchronized if the next message pointer points to the second bit of the half-frame. If the message capsule is not synchronized, the frame formatter 70 fills the current half-frame (from the bit pointed to by the next message pointer) with pad bits, which are all zeros, and correspondingly updates the next message pointer. (See FIG. 6.) If the pad bits fill the entire data frame, the frame formatter 70 sends the frame to the CDMA modulator driver 32 and initializes the next data frame.

If the frame formatter 70 receives a request to format a null message or overhead message the frame formatter 70 places the bits of the respective message into the local buffer starting at the bit indicated by the next message pointer. The frame formatter 70 inserts SCI bits as required by the CDMA standard and updates the next message pointer. If during this process the frame formatter 70 finishes with the frame, it sends the frame to the CDMA modulator driver 32 and continues processing the next frame. After the overhead message is copied to the local buffer, the frame formatter 70 updates the EST and LET of the overhead message for the next transmission and places the message at the end of the overhead message queue 67.

The frame formatter 70 may receive a request to format the data prepared in the combined messages/scheduling data block 68. For each OTA message type, with the exception of a slotted page message, the frame formatter 70 performs the following actions. First, if the temporary data structure containing the OTA messages is empty (that is, no message of this type was scheduled during the corresponding scheduler processing cycle), the frame formatter 70 does nothing and continues its operation. If the temporary data structure is not empty, the frame formatter 70 builds an OTA message using the stored bits. As noted above, for the slotted page message, even if the temporary data structure is empty, the message scheduler 66 may build a message containing no mobile unit directed records but comprising the header having the overhead sequence number.

For each single input message, if the single message being processed is not to be repeated or has been repeated the required number of times, the frame formatter 70 discards the message. If the single message is to be repeated at least once more, the frame formatter 70 updates the EST and LET of the message using the start and end time of the corresponding OTA message. That is, the EST is set to some time after the end time of the new combined OTA message, the delay to the new EST being set by the base station controller 21. The LET is set only when the message is transmitted for the first time and is not changed during subsequent transmissions. Finally, the formatter places the single message into the repeat slotted message input queue 74 or repeat unslotted message input queue 78 as appropriate.

The present invention has been described above in terms of a presently preferred embodiment so that an understanding of the present invention can be conveyed. There are, however, many configurations for message scheduling processors not specifically described herein but with which the present invention is applicable. The present invention should therefore not be seen as limited to the particular embodiment described herein, but rather, it should be understood that the present invention has wide applicability with respect to communications modems generally. All modifications, variations, or equivalent arrangements that are within the scope of the attached claims should therefore be considered to be within the scope of the invention.

I claim:

1. A message processor apparatus that schedules messages for transmission in a telecommunications system, the apparatus comprising:

a slotted message input queue in which received slotted messages that must be sent during one of a subset of predetermined system time slots are stored prior to scheduling;

an unslotted message input queue in which received unslotted messages are stored prior to scheduling;

a message scheduler that determines the sequence in which said slotted and unslotted messages are sent, such that no message remains indefinitely in either said slotted or said unslotted message input queue, by assembling a plurality of said slotted and unslotted input messages into a temporary combined messages block, wherein said message scheduler first considers said slotted messages in said slotted message input queue and then considers said unslotted messages in said unslotted message input queue for a current system time slot for which it is scheduling messages; and a formatter that assembles said slotted and unslotted messages from said temporary combined messages block into data frames for transmission over a channel of said telecommunications system.

2. An apparatus as defined in claim 1, wherein some of said messages have message constraints associated therewith including an earliest starting time and a latest ending time.

3. An apparatus as defined in claim 2, wherein said slotted messages and unslotted messages comprise data messages, order messages, assignment messages, and page messages.

4. An apparatus as defined in claim 2, wherein said message scheduler also schedules overhead-type messages that must be sent at predetermined time intervals.

5. An apparatus as defined in claim 4, wherein initially the message scheduler determines both the number of overhead messages and the amount of time such overhead messages require for transmission, decreases and schedules the overhead messages for transmission at approximately equal intervals within a time period shorter than the predetermined time intervals.

6. An apparatus as defined in claim 5, wherein the predetermined time interval is one second.

7. An apparatus as defined in claim 5, wherein:

the slotted messages are stored in the slotted message input queue according to the next system time slot during which a corresponding one of the slotted messages may be transmitted; and the unslotted messages are stored in the unslotted message input queue according to the time at which a corresponding one of the unslotted messages was initially stored in the unslotted message input queue.

8. An apparatus as defined in claim 7, wherein:

the message scheduler operates in either a start state, a slotted state, or an unslotted state; and the apparatus further comprises:

a modulator driver that receives the data frames from the formatter and temporarily stores the data frames, and a modulator that receives a current data frame from the modulator driver for transmission over the channel when a time stamp value of the current data frame indicates that the current data frame should be transmitted; and the message scheduler begins operation in the start state based on the number of data frames stored in the modulator driver.

9. An apparatus as defined in claim 8, wherein the message scheduler determines if there are an insufficient amount of data in the formatter at the end of the unslotted state to assemble at least one full data frame and, in response, adds to the formatter a sufficient number of null messages to assemble a full data frame.

10. An apparatus as defined in claim 8, wherein the message scheduler begins an operating cycle in the start state; performs synchronization processing and then operates in the slotted state, during which it schedules slotted messages; and then operates in the unslotted state, during which it schedules unslotted messages; and thereupon completes the operating cycle.

11. An apparatus as defined in claim 10, wherein during the start state the message scheduler performs synchronization processing if a next message to be scheduled corresponds to the first message of a next slot.

12. An apparatus as defined in claim 8, wherein the message scheduler changes from the slotted state to the unslotted state and thereby halts considering slotted messages for addition to the temporary combined messages block if a slotted message being considered arrived in the slotted message input queue later than the time at which any one of the unslotted messages arrived in the unslotted message input queue, or if there are no more of the slotted messages to be transmitted during a current time slot for which the message scheduler is scheduling messages.

13. An apparatus as defined in claim 8, wherein the message scheduler computes the amount of time remaining before the last data frame is removed from the modulator driver to the modulator when the message scheduler is in the start state.

14. An apparatus as defined in claim 8, wherein the message scheduler sets a timeout limit on the amount of time it spends scheduling messages when the message scheduler is in the start state.

15. An apparatus as defined in claim 8, wherein the message scheduler reorders the slotted message input queue during the start state based on the next system time slot during which each slotted message can be sent.

16. An apparatus as defined in claim 8, wherein the slotted message input queue includes a primary slotted message input queue having slotted messages that must be sent during a predetermined system time slot and a repeat slotted message input queue having slotted messages that have been transmitted at least once and must be repeatedly transmitted during predetermined system time slots.

17. An apparatus as defined in claim 8, wherein the unslotted message input queue includes a primary unslotted message input queue having unslotted messages that have no time slot transmission constraints and a repeat unslotted message input queue having unslotted messages that have been transmitted at least once and must be repeatedly transmitted for a predetermined number of times or until a maximum retransmission time.

18. An apparatus as defined in claim 8, wherein the message scheduler adds a message from the slotted or unslotted message input queue to the temporary combined messages block by increasing a current message length and ending time of the temporary combined messages block by a message length and duration time of the message and removing the message from its respective input queue if the time at which the message would be sent is not earlier than the earliest start time permitted by the message and if the increased ending time of the temporary combined messages block is not later than the latest ending time permitted by the message, and the message scheduler otherwise does not add the message.

19. An apparatus as defined in claim 18, wherein the message scheduler repeatedly considers messages from the input queues until neither input message queue contains messages that can be transmitted in the system time slot for which messages are being scheduled.

20. An apparatus as defined in claim 8, wherein the formatter provides a data frame to the modulator driver when the amount of time that remains before the last data frame is moved from the modulator driver reaches a predetermined value.

21. An apparatus as defined in claim 1, wherein:
the slotted message input queue includes a primary slotted message queue having slotted messages that must be transmitted during a predetermined system time slot and a repeat slotted message input queue having slotted messages that have been transmitted at least once and must be repeatedly transmitted during predetermined system time slots;
the unslotted message input queue includes a primary unslotted message input queue having unslotted messages that have no time slot transmission constraints and a repeat unslotted message input queue having unslotted messages that have been transmitted at least once and must be repeatedly transmitted for a predetermined number of times or until a maximum retransmission time; and
the message scheduler considers messages from the repeat slotted message input queue before it considers messages from the primary slotted message input queue, and considers messages from the repeat unslotted message input queue before it considers messages from the primary unslotted message input queue when assembling the temporary combined messages block.

22. An apparatus as defined in claim 21, wherein the message scheduler adds a message to the temporary combined messages block by increasing a current message length and ending time of the temporary combined messages block by a message length and duration time of the message being added and removing the message from its respective input queue if the time at which the message would be transmitted is not earlier than the earliest start time permitted by the message and if the increased ending time of the temporary combined messages block is not later than the latest ending time permitted by the message, and otherwise does not add the message.

23. An apparatus as defined in claim 22, wherein the message scheduler discards a message being considered from the repeat slotted message input queue if the earliest start time and latest ending time message constraints of the message are not satisfied and the message cannot be scheduled, and indicates a fault condition.

24. An apparatus as defined in claim 23, wherein the apparatus further includes a controller that reduces the number of messages stored in the slotted and unslotted message input queues when the message scheduler indicates a fault condition.

25. A method of assembling a plurality of messages for transmission over a channel of a telecommunications system during a time slot of the system, the method comprising the steps of:
receiving messages from a slotted message input queue, in which messages that must be sent during one of a subset of predetermined system time slots are stored, and receiving messages from an unslotted message input queue, in which unslotted messages that do not have a system time slot restriction are stored;
assembling a temporary combined messages block comprising messages to be transmitted during the predetermined system time slot by repeatedly adding messages from the slotted message input queue and unslotted message input queue and overhead type messages to the temporary combined messages block such that no message remains indefinitely in either said slotted or said unslotted input queue; and formatting the messages and overhead type messages of the temporary combined messages block into a data frame for transmission over the telecommunications channel.

26. A method as defined in claim 25, wherein the overhead type messages must be transmitted at predetermined time intervals.

27. A method as defined in claim 26, further including the step of considering overhead type messages prior to assembling the temporary combined messages block, wherein the step of considering comprises the steps of:
determining a number of overhead messages to be transmitted during a predetermined amount of time;
determining the amount of time such overhead messages will require for transmission;
increasing the time required for transmission by a predetermined amount; and
scheduling the overhead messages for transmission at approximately equal intervals within the predetermined amount of time.

28. A method as defined in claim 27, wherein the predetermined amount of time for transmission of overhead type messages is one second.

29. A method as defined in claim 28, wherein the messages are added in the step of assembling until neither input message queue contains messages that can be transmitted in the system time slot for which messages are being scheduled.

30. A method as defined in claim 29, wherein the step of assembling includes adding a message from the slotted or unslotted message input queue or an overhead type message in accordance with message constraints associated therewith, including a message earliest starting time and a message latest ending time.

31. A method as defined in claim 30, wherein the step of assembling comprises an operating cycle beginning in a start state, during which synchronization processing is performed; followed by a slotted state, during which slotted messages are scheduled; and then followed by an unslotted state, during which unslotted messages are scheduled.

32. A method as defined in claim 31, wherein the messages scheduled comprise a plurality of message types and only one message of each type is scheduled during an operating cycle.

33. A method as defined in claim 30, wherein the operating cycle state is changed from the slotted state to the unslotted state if a slotted message being scheduled arrived in the slotted message input queue later than an earliest time at which an unslotted message arrived in the unslotted message input queue, or if there are no more slotted messages to be transmitted in the current system time slot for which messages are being scheduled.

34. A method as defined in claim 30, wherein the slotted message input queue is reordered during the start state such that slotted messages are ordered according to the next system time slot during which each slotted message can be sent.

35. A method as defined in claim 30 wherein:
a message is added to the temporary combined messages block from the slotted or unslotted message input queue by increasing a current message length and ending time of the temporary combined messages block by a message length and duration time of the message and removing the message from its respective input queue if the time at which the message would be sent is not earlier than the earliest start time permitted by the message and if the increased ending time of the temporary combined messages block is not later than the latest ending time permitted by the message, and otherwise the message is not added.

36. A method as defined in claim 35, wherein:

the slotted message input queue includes a primary slotted message input queue having slotted messages that must be transmitted during a predetermined system time slot and a repeat slotted message input queue having slotted messages that have been transmitted at least once and must be repeatedly transmitted during predetermined system time slots; and the step of adding a message from the slotted message input queue to the temporary combined messages block further comprises adding messages from the repeat slotted message input queue before adding messages from the primary slotted message input queue.

37. A method as defined in claim 36, wherein the step of adding messages from the repeat slotted message input queue is halted if a message from the repeat slotted message input queue is not added.

38. A method as defined in claim 36, wherein the step of adding messages from the repeat slotted message input queue is halted if a message scheduling time out condition occurs.

39. A method as defined in claim 36, wherein the step of adding messages from the repeat slotted message input queue is halted if an overhead type message becomes due to be transmitted.

40. A method as defined in claim 35, wherein:

the unslotted message input queue includes a primary unslotted message input queue having unslotted messages that have no time slot transmission constraints and a repeat unslotted message input queue having unslotted messages that have been transmitted at least once and must be repeatedly transmitted for a predetermined number of times or until a maximum retransmission time; and the step of adding a message from the unslotted message input queue to the temporary combined messages block further comprises adding messages from the repeat unslotted message input queue before adding messages from the primary unslotted message input queue.

41. A method as defined in claim 40, wherein the step of adding messages from the repeat unslotted message input queue is halted if a message from the repeat unslotted message input queue is not added.

42. A method of assembling a plurality of messages for transmission over a channel of a telecommunications system, the method comprising the steps of:

receiving a message for assembling;

placing the message in a slotted message input queue if the message must be transmitted during one of a subset of predetermined system time slots;

placing the message in an unslotted message input queue if the message does not have a system time slot restriction;

scheduling a predetermined number of overhead type messages to be transmitted during a predetermined amount of time by determining the amount of time such overhead type messages will require for transmission, increasing the time required for transmission by a predetermined amount, and assigning transmission due times to the overhead type messages at approximately equal intervals within the predetermined amount of time;

assembling a temporary combined messages block comprising a plurality of messages to be transmitted by considering the input queues and adding a message from the slotted or unslotted message input queues by increasing a current message length and ending time of the temporary combined messages block by a message length and duration time of the message and removing the message from its respective input queue if the time at which the message would be sent is not earlier than an earliest start time permitted by the message and if the increased ending time of the temporary combined messages block is not later than a latest ending time permitted by the message, and otherwise not adding the message; and formatting the messages and overhead type messages of the temporary combined messages block into a data frame for transmission over the telecommunications channel.

43. A method as defined in claim 42, wherein:

the slotted message input queue includes a primary slotted message input queue having slotted messages that must be sent during a predetermined system time slot and a repeat slotted message input queue having slotted messages that have been transmitted at least once and must be repeatedly transmitted during predetermined system time slots; and the step of assembling further comprises adding messages from the repeat slotted message input queue to the temporary combined messages block before adding messages from the primary slotted message input queue.

44. A method as defined in claim 43, wherein the step of adding messages from the repeat slotted message input queue is halted if a message from the repeat slotted message input queue is not added.

45. A method as defined in claim 43, wherein the step of adding messages from the repeat slotted message input queue is halted if a message scheduling time out condition occurs.

46. A method as defined in claim 43, wherein the step of adding messages from the repeat slotted message input queue is halted if an overhead type message becomes due to be transmitted.

47. A method as defined in claim 42, wherein:

the unslotted message input queue includes a primary unslotted message input queue having unslotted messages that have no time slot transmission constraints and a repeat unslotted message input queue having unslotted messages that have been transmitted at least once and must be repeatedly transmitted for a predetermined number of times or until a maximum retransmission time; and the step of adding a message from the unslotted message input queue to the temporary combined messages block further comprises adding messages from the repeat unslotted message input queue before adding messages from the primary unslotted message input queue.

48. A method as defined in claim 47, wherein the step of adding messages from the repeat unslotted message input queue is halted if a message from the repeat unslotted message input queue is not added.

49. A message processor apparatus that schedules messages for transmission in a telecommunications system, in which each message is associated with message constraints including an earliest permitted starting time and a latest permitted ending time, the apparatus comprising:

a slotted message input queue in which messages comprising slotted messages that must be sent during a predetermined system time slot are stored prior to scheduling according to the next system time slot during which each message may be transmitted and, within a particular time slot, according to the time at which the message was initially stored in the slotted message input queue;

an unslotted message input queue in which received messages comprising unslotted messages that have no system time slot during which they must be sent are stored prior to scheduling according to the time at which the message was initially stored in the unslotted message input queue;

a message scheduler that operates in either a start state, slotted state, or unslotted state and determines the sequence in which messages will be sent such that no message is left indefinitely in either said slotted or said unslotted message input queue by assembling a plurality of said slotted and unslotted input messages into a temporary combined messages block, wherein said message scheduler first considers said slotted messages in said slotted message input queue and then considers said unslotted messages in said unslotted message input queue for a current system time slot for which it is scheduling messages;

a formatter that assembles said slotted and unslotted messages from said temporary combined messages block into data frames for transmission over a channel of said telecommunications system;

a modulator driver that receives the data frames from the formatter and temporarily stores the data frames, and a modulator that receives a data frame from the modulator driver for transmission over the data channel when a predetermined time stamp value of the data frame indicates that the data frame should be transmitted.

50. An apparatus as defined in claim 49, wherein the message scheduler begins operation in the start state when the number of data frames stored in the modulator driver reaches a predetermined value.

51. An apparatus as defined in claim 49, wherein the message scheduler changes from the slotted state to the unslotted state and thereby halts considering slotted messages for adding to the temporary combined messages block if a slotted message being considered arrived in the slotted message input queue later than an earliest time at which an unslotted message arrived in the unslotted message input queue, or if there are no more slotted messages to be transmitted during the current system time slot for which the message scheduler is scheduling messages.

52. An apparatus as defined in claim 51, wherein the message scheduler sets a timeout limit on the amount of time it will spend scheduling messages when the message scheduler is in the start state.

53. An apparatus as defined in claim 51, wherein the message scheduler reorders the slotted message input queue during the start state such that slotted messages are ordered according to the next system time slot during which each slotted message can be sent.

54. An apparatus as defined in claim 51, wherein the slotted message input queue includes a primary slotted message input queue having slotted messages that must be sent during a predetermined system time slot and a repeat slotted message input queue having slotted messages that have been transmitted at least once and must be repeatedly transmitted during predetermined system time slots.

55. An apparatus as defined in claim 51, wherein the unslotted message input queue includes a primary unslotted message input queue having unslotted messages that have no time slot transmission constraints and a repeat unslotted message input queue having unslotted messages that have been transmitted at least once and must be repeatedly transmitted for a predetermined number of times or until a maximum retransmission time.

56. An apparatus as defined in claim 51, wherein the message scheduler adds a message from the slotted or unslotted message input queue to the temporary combined messages block by increasing a current message length and ending time of the temporary combined messages block by a message length and duration time of the message and removing the message from its respective input queue if the time at which the message would be sent is not earlier than the earliest start time permitted by the message and if the increased ending time of the temporary combined messages block is not later than the latest ending time permitted by the message, and the message scheduler otherwise does not add the message.

57. An apparatus as defined in claim 56, wherein the message scheduler repeatedly considers messages from the input queues until neither input message queue contains messages that can be transmitted in the system time slot for which messages are being scheduled.

58. An apparatus as defined in claim 51, wherein the formatter provides a data frame to the modulator driver when the amount of time that remains before the last data frame is moved from the modulator driver reaches a predetermined value.

59. An apparatus as defined in claim 51, wherein:

the slotted message input queue includes a primary slotted message queue having slotted messages that must be transmitted during a predetermined system time slot and a repeat slotted message input queue having slotted messages that have been transmitted at least once and must be repeatedly transmitted during predetermined system time slots;

the unslotted message input queue includes a primary unslotted message input queue having unslotted messages that have no time slot transmission constraints and a repeat unslotted message input queue having unslotted messages that have been transmitted at least once and must be repeatedly transmitted for a predetermined number of times or until a maximum retransmission time; and the message scheduler considers messages from the repeat slotted message input queue before it considers messages from the primary slotted message input queue, and considers messages from the repeat unslotted message input queue before it considers messages from the primary unslotted message input queue.

60. An apparatus as defined in claim 59, wherein the message scheduler adds a message to the temporary combined messages block by increasing a current message length and ending time of the temporary combined messages block by a message length and duration time of the message being added and removing the message from its respective input queue if the time at which the message would be transmitted is not earlier than the earliest start time permitted by the message and if the increased ending time of the temporary combined messages block is not later than the latest ending time permitted by the message, and otherwise does not add the message.

61. An apparatus as defined in claim 60, wherein the message scheduler discards a message being considered from the repeat slotted message input queue if the earliest start time and latest ending time message constraints of the message are not satisfied and the message cannot be scheduled, and indicates a fault condition.

62. An apparatus as defined in claim 61, wherein the apparatus further includes a controller that reduces the number of messages stored in the slotted and unslotted message input queues when the message scheduler indicates a fault condition.

63. A base station of a telecommuncations system over which messages are transmitted, the base station comprising:

a base station controller;

a message input processor that receives messages from the base station controller for transmission;

a slotted message input queue in which received slotted messages that must be sent during one of a subset of predetermined system time slots are stored by the message input processor;

an unslotted message input queue in which received unslotted messages are stored by the message input processor;

a message scheduler that operates in either a start state, slotted state, or unslotted state and determines the sequence in which messages will be sent such that no message is left indefinitely in either said slotted or said unslotted message input queue by assembling a plurality of said slotted and unslotted input messages into a temporary combined messages block, wherein said message scheduler first considers said slotted messages in said slotted message input queue and then considers said unslotted messages in said unslotted message input queue for a current system time slot for which it is scheduling messages;

a formatter that assembles said slotted and unslotted messages from said temporary combined messages block into data frames for transmission over a channel of said telecommunications system;

a modulator driver that receives the data frames from the formatter and temporarily stores the data frames, and a modulator that receives a data frame from the modulator driver for transmission over the data channel when a predetermined time stamp value of the data frame indicates that the data frame should be transmitted.

64. An apparatus as defined in claim 63, wherein some of said messages have message constraints associated therewith including an earliest starting time and a latest ending time.

65. An apparatus as defined in claim 64, wherein said message scheduler also assembles overhead-type messages that must be sent at predetermined time intervals into the temporary combined messages block.

66. An apparatus as defined in claim 65, wherein the message scheduler determines both the number of overhead messages to be transmitted during a predetermined amount of time and the amount of time such overhead messages will require for transmission, increases the time required for transmission by a predetermined amount, and schedules the overhead messages for transmission at approximately equal intervals within the predetermined amount of time.

67. An apparatus as defined in claim 66, wherein the predetermined amount of time is one second.

68. An apparatus as defined in claim 67, wherein:

the slotted messages are stored in the slotted message input queue according to the next system time slot during which the message may be transmitted and, within a particular time slot, according to the time at which the message was initially stored in the slotted message input queue; and the unslotted messages are stored in the unslotted message input queue according to the time at which the message was initially stored in the unslotted message input queue.

69. An apparatus as defined in claim 68, wherein the message scheduler begins operation in the start state when the number of data frames stored in the modulator driver reaches a predetermined value.

70. An apparatus as defined in claim 69, wherein the message scheduler changes from the slotted state to the unslotted state and thereby halts considering slotted messages for adding to the temporary combined messages block if a slotted message being considered arrived in the slotted message input queue later than an earliest time at which an unslotted message arrived in the unslotted message input queue, or if there are no more slotted messages to be transmitted during the current system time slot for which the message scheduler is scheduling messages.

71. An apparatus as defined in claim 69, wherein the message scheduler adds a message from the slotted or unslotted message input queue to the temporary combined messages block by increasing a current message length and ending time of the temporary combined messages block by a message length and duration time of the message and removing the message from its respective input queue if the time at which the message would be sent is not earlier than the earliest start time permitted by the message and if the increased ending time of the temporary combined messages block is not later than the latest ending time permitted by the message, and the message scheduler otherwise does not add the message.

72. An apparatus as defined in claim 71, wherein the message scheduler repeatedly considers messages from the input queues until neither input message queue contains messages that can be transmitted in the system time slot for which messages are being scheduled.

73. An apparatus as defined in claim 69, wherein the formatter provides a data frame to the modulator driver when the amount of time that remains before the last data frame is moved from the modulator driver reaches a predetermined value.

74. An apparatus as defined in claim 69 wherein:

the slotted message input queue includes a primary slotted message queue having slotted messages that must be transmitted during a predetermined system time slot and a repeat slotted message input queue having slotted messages that have been transmitted at least once and must be repeatedly transmitted during predetermined system time slots;

the unslotted message input queue includes a primary unslotted message input queue having unslotted messages that have no time slot transmission constraints and a repeat unslotted message input queue having unslotted messages that have been transmitted at least once and must be repeatedly transmitted for a predetermined number of times or until a maximum retransmission time; and the message scheduler considers messages from the repeat slotted message input queue before it considers messages from the primary slotted message input queue, and considers messages from the repeat unslotted message input queue before it considers messages from the primary unslotted message input queue when assembling the temporary combined messages block.

75. An apparatus as defined in claim 74, wherein the message scheduler adds a message to the temporary combined messages block by increasing a current message length and ending time of the temporary combined messages block by a message length and duration time of the message being added and removing the message from its respective input queue if the time at which the message would be transmitted is not earlier than the earliest start time permitted by the message and if the increased ending time of the temporary combined messages block is not later than the latest ending time permitted by the message, and otherwise does not add the message.

76. An apparatus as defined in claim 75, wherein the message scheduler discards a message being considered from the repeat slotted message input queue if the earliest start time and latest ending time message constraints of the message are not satisfied and the message cannot be scheduled, and indicates a fault condition.

77. An apparatus as defined in claim 75, wherein the apparatus further includes a controller that reduces the number of messages stored in the slotted and unslotted message input queues when the message scheduler indicates a fault condition.

78. A method of assembling a plurality of messages for transmission over a channel of a telecommunications system during a predetermined time slot of the system, the method comprising the steps of:

receiving messages from a slotted message input queue, in which received messages that must be sent during one of a subset of predetermined system time slots are stored, and from an unslotted message input queue, in which received unslotted messages that do not have a system time slot restriction are stored;

scheduling overhead-type messages for transmission by determining a number of overhead messages to be transmitted during a predetermined amount of time, determining the amount of time such overhead messages will require for transmission, increasing the time required for the transmission by a predetermined amount, and assigning the overhead messages due times for transmission at approximately equal intervals within the predetermined amount of time;

assembling a temporary combined messages block comprising messages to be transmitted during the predetermined system time slot by repeatedly adding a message from the slotted and unslotted message input queue by increasing a current message length and ending time of the temporary combined messages block by a message length and duration time of the message and removing the message from its respective input queue if the time at which the message would be sent is not earlier than an earliest start time permitted by the message and if the increased ending time of the temporary combined messages block is not later than a latest ending time permitted by the message, and otherwise not adding the message, until neither input message queue contains messages that can be scheduled in the system time slot for which messages are being scheduled, such that no message remains indefinitely in either said slotted or said unslotted input queue; and formatting the messages and overhead type messages of the temporary combined messages block into a data frame for transmission over the telecommunications channel.

79. A method as defined in claim 77, wherein the step of assembling comprises an operating cycle beginning in a start state, during which synchronization processing is performed, followed by a slotted state, during which slotted messages are scheduled, and then followed by an unslotted state, during which unslotted messages are scheduled.

80. A method as defined in claim 78, wherein the messages scheduled comprise a plurality of message types and one message of each type is scheduled during an operating cycle.

81. A method as defined in claim 69, wherein the operating cycle state changes from the slotted state to the unslotted state if a slotted message being considered arrived in the slotted message input queue later than an earliest time at which an unslotted message arrived in the unslotted message input queue, or if there are no more slotted messages to be transmitted during the current system time slot for which messages are being scheduled.

82. A method as defined in claim 81, wherein:

the slotted message input queue includes a primary slotted message input queue having slotted messages that must be transmitted during a predetermined system time slot and a repeat slotted message input queue having slotted messages that have been transmitted at least once and must be repeatedly transmitted during predetermined system time slots; and the step of adding a message from the slotted message input queue to the temporary combined message block further comprises adding messages from the repeat slotted message input queue before adding messages from the primary slotted message input queue.

83. A method as defined in claim 82, wherein the step of adding messages from the repeat slotted message input queue is halted if a message from the repeat slotted message input queue is not added.

84. A method as defined in claim 81, wherein the step of adding messages from the repeat slotted message input queue is halted if a message scheduling time out condition occurs.

85. A method as defined in claim 81, wherein the step of adding messages from the repeat slotted message input queue is halted if an overhead type message becomes due to be transmitted.

86. A method as defined in claim 80, wherein:

the unslotted message input queue includes a primary unslotted message input queue having unslotted messages that have no time slot transmission constraints and a repeat unslotted message input queue having unslotted messages that have been transmitted at least once and must be repeatedly transmitted for a predetermined number of times or until a maximum retransmission time; and the step of adding a message from the unslotted message input queue to the temporary combined message block further comprises adding messages from the repeat unslotted message input queue before adding messages from the primary unslotted message input queue.

87. A method as defined in claim 86, wherein the step of adding messages from the repeat unslotted message input queue is halted if a message from the repeat unslotted message input queue is not added.

* * * * *